United States Patent
Muffat et al.

(10) Patent No.: US 12,046,067 B2
(45) Date of Patent: Jul. 23, 2024

(54) OPTICAL CHARACTER RECOGNITION SYSTEMS AND METHODS FOR PERSONAL DATA EXTRACTION

(71) Applicant: Dathena Science Pte. Ltd., Singapore (SG)

(72) Inventors: Christopher Muffat, Singapore (SG); Tetiana Kodliuk, Singapore (SG)

(73) Assignee: DATHENA SCIENCE PTE. LTD., Singapore (SG)

( * ) Notice: Subject to any disclaimer, the term of this patent is extended or adjusted under 35 U.S.C. 154(b) by 354 days.

(21) Appl. No.: 17/348,433

(22) Filed: Jun. 15, 2021

(65) Prior Publication Data

US 2022/0398399 A1    Dec. 15, 2022

(30) Foreign Application Priority Data

Jun. 11, 2021 (SG) .................. 10202106308X

(51) Int. Cl.
| | |
|---|---|
| G06V 30/416 | (2022.01) |
| G06F 18/22 | (2023.01) |
| G06N 3/045 | (2023.01) |
| G06N 3/08 | (2023.01) |
| G06V 10/46 | (2022.01) |
| G06V 30/10 | (2022.01) |
| G06V 30/164 | (2022.01) |
| G06V 30/28 | (2022.01) |

(52) U.S. Cl.
CPC ............ *G06V 30/416* (2022.01); *G06F 18/22* (2023.01); *G06N 3/045* (2023.01); *G06N 3/08* (2013.01); *G06V 10/462* (2022.01); *G06V 30/10* (2022.01); *G06V 30/164* (2022.01); *G06V 30/293* (2022.01)

(58) Field of Classification Search
CPC .... G06V 30/10; G06V 30/164; G06V 30/293; G06V 30/416; G06V 10/462; G06F 18/22; G06N 3/045; G06N 3/08
See application file for complete search history.

(56) References Cited

U.S. PATENT DOCUMENTS

| | | | |
|---|---|---|---|
| 2012/0330731 A1* | 12/2012 | Wagoner ................ | G07C 13/00 705/12 |
| 2019/0075218 A1* | 3/2019 | Ribani .................. | G06F 3/1238 |

(Continued)

OTHER PUBLICATIONS

Kyung, et al. (Computer English Translation of Korean Patent No. KR 20180099180 A), pp. 1-11. (Year: 2018).*

(Continued)

*Primary Examiner* — Daniel G Mariam
(74) *Attorney, Agent, or Firm* — Crowell & Moring LLP

(57) ABSTRACT

Methods and systems for extracting personal data from a sensitive document are provided. The system includes a document prediction module, a cropping module, a denoising module, and an optical character recognition (OCR) module. The document prediction module predicts type of document of the sensitive document using a keypoint matching-based approach and the cropping module extracts document shape and extracts one or more fields comprising text or pictures from the sensitive document. The denoising module prepares the one or more fields for optical character recognition, and the OCR module performs optical character recognition on the denoised one or more fields to detect characters in the one or more fields.

18 Claims, 24 Drawing Sheets

(56) References Cited

U.S. PATENT DOCUMENTS

2022/0012484 A1* 1/2022 Bulatov ............... G06V 30/413
2022/0309332 A1* 9/2022 V V Ganeshan ........ G06N 3/08

OTHER PUBLICATIONS

Alsaiari, et al. (Image Denoising Using a Generative Adversarial Network), pp. 1-7. (Year: 2019).*
Tavakolian, et al. (Real-time information retrieval from Identity cards), pp. 1-6. (Year: 2020).*

* cited by examiner

260

*SPELLCHECKER*

| | 1335 | 1340 | 1345 |
|---|---|---|---|
| | Title (Thai) | Title (English) | Freq. |
| | นาย | Mr. | 43.98% |
| | นาง | Mrs. | 22.63% |
| | น.ส. | Miss | 30.00% |
| | ด.ช. | Master | 0.53% |
| | พระ | Phra | 0.23% |
| | พระครู | Phrakhru | 0.08% |

| | 1365 | 1370 | 1375 |
|---|---|---|---|
| | Blood type (Thai) | Blood type (English) | Freq. |
| | เอ | A | 16.9% |
| | บี | B | 36.8% |
| | เอบี | AB | 4.97% |
| | โอ | O | 40.8% |

FIG. 13C 1360

OPTICAL CHARACTER RECOGNITION SYSTEMS AND METHODS FOR PERSONAL DATA EXTRACTION

PRIORITY CLAIM

This application claims priority from Singapore Patent Application No. 10202106308X filed on Jun. 11, 2021, the entirety of which is hereby incorporated by reference herein.

TECHNICAL FIELD

The present disclosure relates to optical character recognition, and more particularly relates to systems and methods for optical character recognition for personal data extraction.

BACKGROUND OF THE DISCLOSURE

New regulations in effect or coming into effect in Europe (General Data Protection Regulation (GDPR)), US (on a federal basis), Brazil (General Data Protection Law), Singapore (Personal Data Protection Act) and other countries set standards for data protection and privacy for an individual's personal information. Compliance with such regulations is challenging in today's data-driven world where companies need to retrieve personal information not only from structured and unstructured documents, but also from scanned images like identification cards, passport scans, and application forms. Such personal information may include name, date of birth, address, identification number, issue date and information in other fields, and extraction of such personal information needs to be accurate for regulation compliance. And such scanned images may include additional writings or marks thereon for various reasons such as authentication or categorization An important and widely used tool allowing extraction of text from images is Optical Character Recognition (OCR). However, the poor quality of scanned documents and the noisiness introduced by additional marks on the scanned images makes the OCR process challenging and requires a lot of effort and time during image preprocessing stages. In addition, the data extracted from poor quality and/or noisy images using an OCR engine may be wrong. This can be especially challenging as different languages use different characters or alphabets that can include several portions or marks that are essential for character/letter recognition.

Thus, there is a need for methods and systems for optical character recognition for extraction of personal information so that such personal information can be handled in accordance with data protection and privacy regulations that are accurate and able to solve the above-mentioned shortcomings and provide further advantages in terms of time and cost savings. Furthermore, other desirable features and characteristics will become apparent from the subsequent detailed description and the appended claims, taken in conjunction with the accompanying drawings and this background of the disclosure.

SUMMARY

According to at least one embodiment, a method for extracting personal data from a sensitive document is provided. The method includes predicting type of document by keypoint matching of the sensitive document and cropping the sensitive document in response to the type of document predicted to extract document shape and extract one or more fields, the one or more fields comprising text or pictures. The method further includes denoising the one or more fields to prepare them for optical character recognition and performing optical character recognition on the denoised one or more fields to detect characters in the one or more fields.

According to another embodiment of the present disclosure, a system for extracting personal data from a sensitive document is provided. The system includes a document prediction module, a cropping module, a denoising module, and an optical character recognition (OCR) module. The document prediction module predicts type of document of the sensitive document using a keypoint matching-based approach and the cropping module extracts document shape and extracts one or more fields comprising text or pictures from the sensitive document. The denoising module prepares the one or more fields for optical character recognition, and the OCR module performs optical character recognition on the denoised one or more fields to detect characters in the one or more fields.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIGS. 1A and 1B depict examples of structured and unstructured documents for data extraction of personal information in accordance with present embodiments, wherein FIG. 1A depicts a Thai national identification card mock-up and FIG. 1B depicts a scanned image of front and back of the Thai national identification card mock-up of FIG. 1A.

FIGS. 5A and 5B illustrate operation of the generation prediction module of FIG. 4 in accordance with the present embodiments, wherein FIG. 5A depicts a flow diagram of the generation prediction module and FIG. 5B depicts an illustration of the operation of the generation prediction module.

FIGS. 6A and 6B illustrate operation of the image cropping module of FIG. 4 in accordance with the present embodiments, wherein FIG. 6A depicts a flow diagram of the image cropping module and FIG. 6B depicts an illustration of the operation of the image cropping module.

FIGS. 7A and 7B illustrate operation of the fields cropping module of FIG. 4 in accordance with the present embodiments, wherein FIG. 7A depicts a flow diagram of the fields cropping module and FIG. 7B depicts an illustration of the operation of the fields cropping module.

FIGS. 8A and 8B illustrate operation of the denoising module of FIG. 4 in accordance with the present embodiments, wherein FIG. 8A depicts a flow diagram of the denoising module and FIG. 8B depicts a table illustrating operation of the denoising module.

FIGS. 10A to 10F illustrate operation of the optical character recognition (OCR) module of FIG. 4 in accordance with the present embodiments, wherein FIG. 10A depicts a flow diagram of the OCR module, FIG. 10B depicts illustrations of OCR extraction of a good quality low background noise field using Tesseract, FIG. 10C depicts illustrations of OCR extraction using Tesseract in a page segmentation mode, FIG. 10D depicts illustrations of page segmentation mode having a configuration for multiple predictions of a single image, FIG. 10E depicts illustrations of resealing a single image multiple times with configurations for multiple predictions of each resealing, and FIG. 10F depicts a table of effective sets of parameters for several fields developed using grid search.

FIGS. 11A and 11B illustrate a pre-Tesseract cleaning operation of the optical character recognition (OCR) module of FIG. 4 in accordance with the present embodiments, wherein FIG. 11A depicts a pre-cleaned religion field and FIG. 11B depicts a flow diagram of the cleaning operation on the religion field of FIG. 11A.

FIG. 12 depicts an illustration of spellchecking by the correction module of FIG. 4 in accordance with the present embodiments.

FIGS. 13A, 13B and 13C depict tables of categorical fields having a limited number of correct values for categorization by the categorization module of FIG. 4 in accordance with the present embodiments, wherein FIG. 13A depicts a table of religions, FIG. 13B depicts a table of personal titles, and FIG. 13C depicts a table of blood types.

FIGS. 14A, 14B and 14C depict categorization by the categorization module of FIG. 4 tables of categorical fields having a limited number of correct values in accordance with the present embodiments, wherein FIG. 14A depicts input of a religion field, FIG. 14B depicts an exemplary process for choosing the most probable value, and FIG. 14C the result of the categorization.

FIGS. 15A to 15G depict graphical measurements of accuracy for modules of the pipeline flow diagram of FIG. 4 in accordance with the present embodiments, wherein FIG. 15A is a graphical illustration showing accuracy of generation prediction and non-ID card detection by the generation prediction module 410 over several input quality levels, FIG. 15B is a graphical illustration showing accuracy of ID card cropping by the ID card cropping module 420 over several input quality levels, FIG. 15C is a graph showing denoising of image backgrounds by the denoising module 440 for thirteen denoised images, FIG. 15D is a bar graph showing preprocessing results for images of four quality levels, FIG. 15E is a graphical illustration showing the decrease in character error rate for digits as the Tesseract OCR model is fine-tuned, FIG. 15F is a bar graph showing performance and accuracy of prediction of the pipeline of FIG. 4, and FIG. 15G is a graphical illustration showing accuracy loss contribution from processing at the various steps of the pipeline of FIG. 4.

FIGS. 16A and 16B depict tables for lite version processing speed and full version processing speed of modules of the pipeline of FIG. 4 in accordance with the present embodiments, wherein FIG. 16A is a table of processing speed of one image and FIG. 16B is a table of processing speed for a batch of 25 images.

FIGS. 17A and 17B depict pie charts for lite version processing speed and full version processing speed of a batch of 25 images passing through the modules of the pipeline of FIG. 4 in accordance with the present embodiments, wherein FIG. 17A is a pie chart of lite mode processing speed and FIG. 17B is a pie chart of full version processing speed.

FIGS. 18A and 18B depict pie charts for lite version processing speed and full version processing speed of one image passing through the modules of the pipeline of FIG. 4 in accordance with the present embodiments, wherein FIG. 18A is a pie chart of lite mode processing speed and FIG. 18B is a pie chart of full version processing speed.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of the present embodiments to present systems and devices for extraction of personal information from structured and unstructured documents, including scanned images of such documents, which provides sufficient accuracy to be compliant with regulations for handling and protection of personal information. The systems and devices in accordance with the present embodiments include processes for image rescaling, normalization, rotation and cropping which need to be performed in order to obtain only predefined text areas from such documents. As scanned images contain a lot of noise and signature, the scanned images are denoised and cleaned in accordance with present embodiments. Once the images are denoised and cleaned, the extracted data is corrected using a post-OCR text correction pipeline in order to correct mistakes such as spelling mistakes.

Figure 1A:
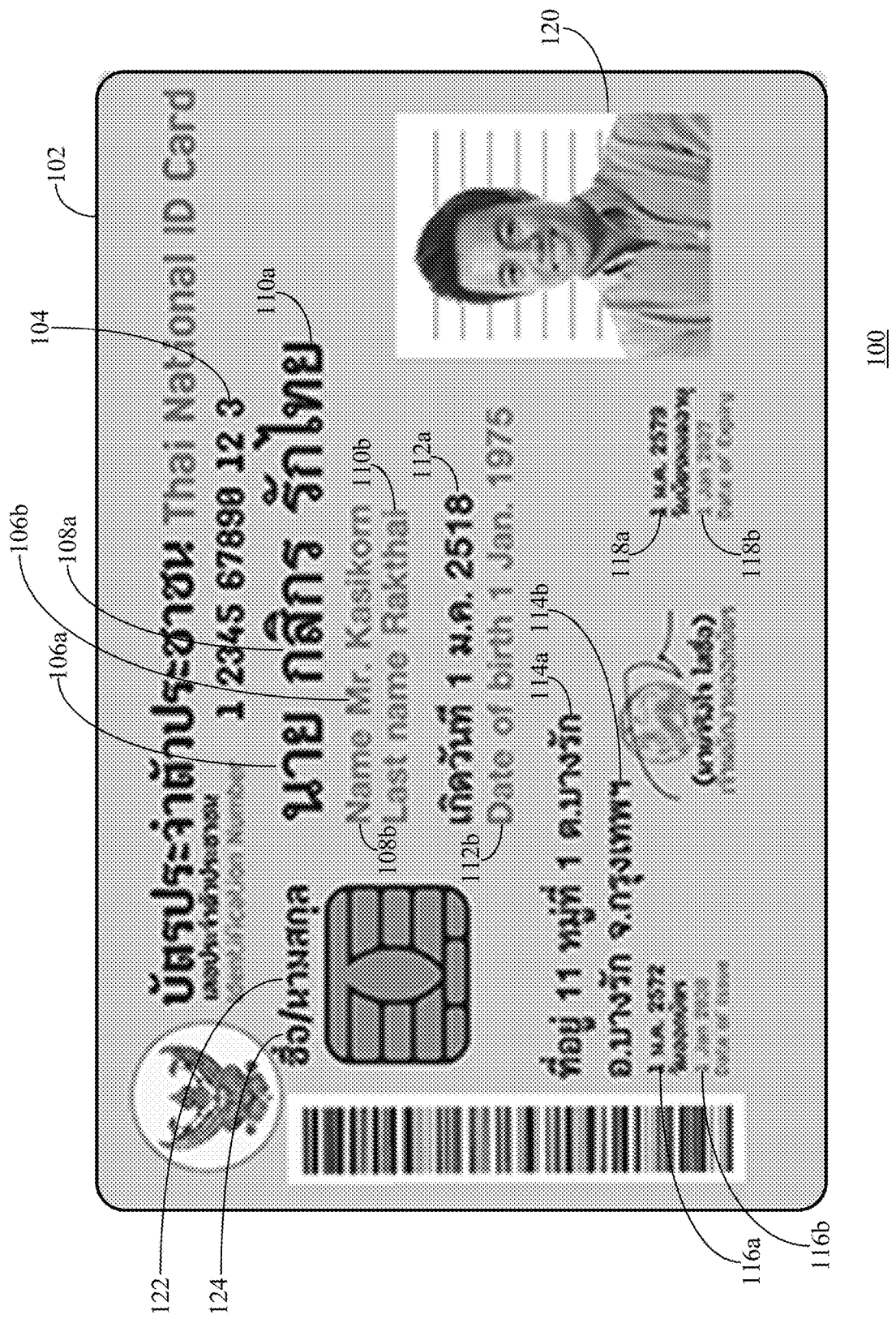

In accordance with the present embodiments, all required text information of personal data is required to be extracted from scanned images. Referring to FIG. 1A, an illustration 100 of a mock-up of a Thai citizen identification (ID) card 102 is depicted. The Thai citizen ID cards are used in examples of structure and operation of the present embodiments discussed herein as they include both English language and Thai language information as well as numerical information in predefined text areas. Those skilled in the art will realize that the present embodiments can be used for optical character recognition (OCR) of other single-language or multi-language structured or non-structured documents.

The mock-up ID card 102 is used to illustrate that various fields contain different personal data of the cardholder in a pre-defined structure. However, those skilled in the art will realize that the layout of ID cards are periodically updated to, for example, include more information than previous ID card generations. While the present embodiments can extract personal information from various ID card layouts and trained for new ID card layouts, the general fields on the exemplary dual-language ID card 102 include a cardholder ID number field 104, dual-language cardholder title fields 106a, 106b, dual-language cardholder first name fields 108a, 108b, dual-language cardholder last name fields 110a, 110b, dual-language cardholder date of birth fields 112a, 112b, single-language cardholder address fields 114a, 114b, dual-language card issue date fields 116a, 116b, dual-language card expiration date fields 118a, 118b, a cardholder photo field 120, a single-language cardholder religion field 122 and a single-language cardholder blood type field 124.

Figure 1B:
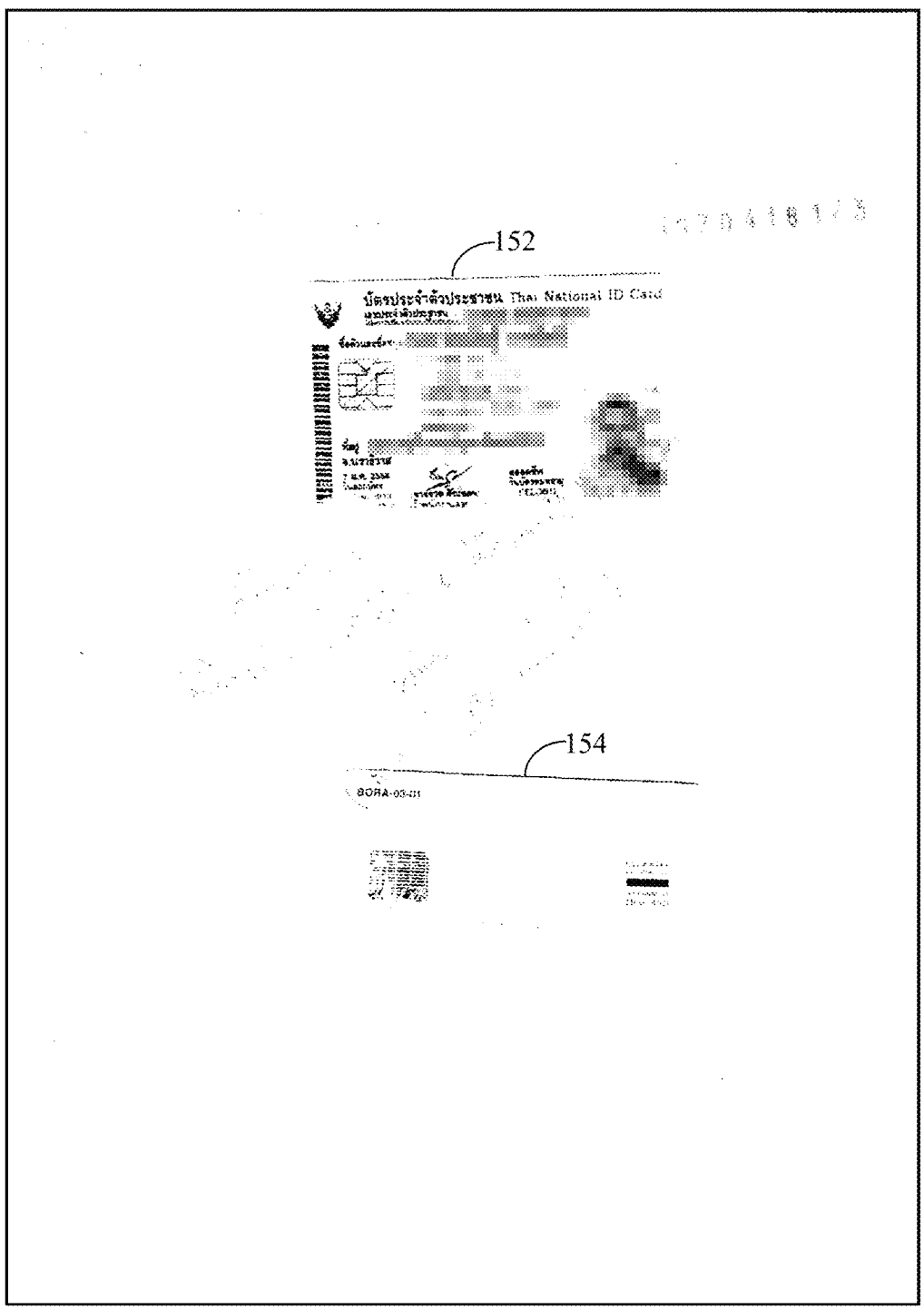
Figure 2A:
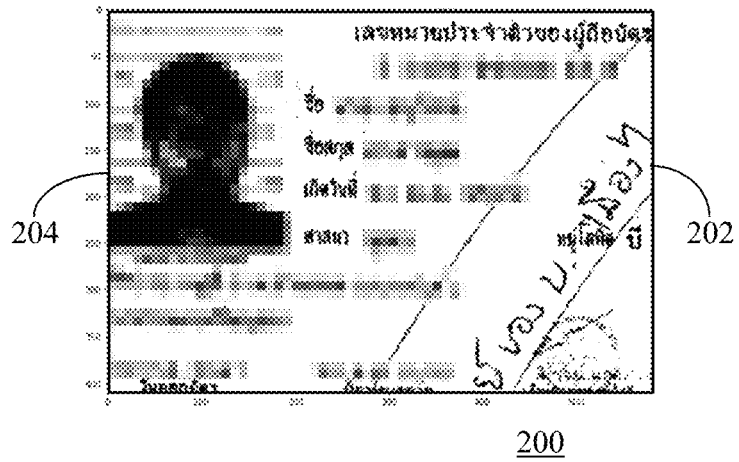
FIGS. 2A to 2C depict scanned images of poor quality for personal information extraction in accordance with the present embodiments.
Figure 2B:
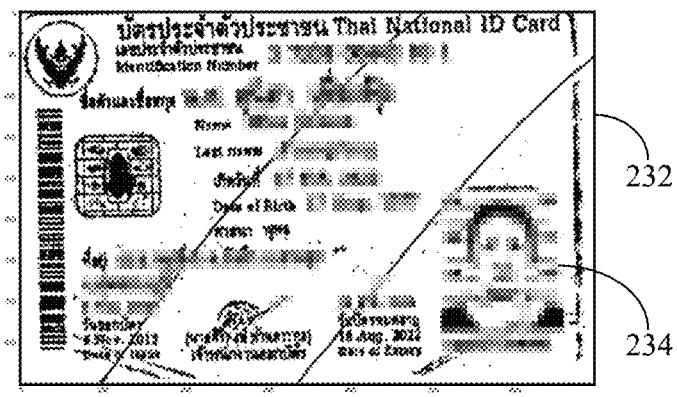
Figure 2C:
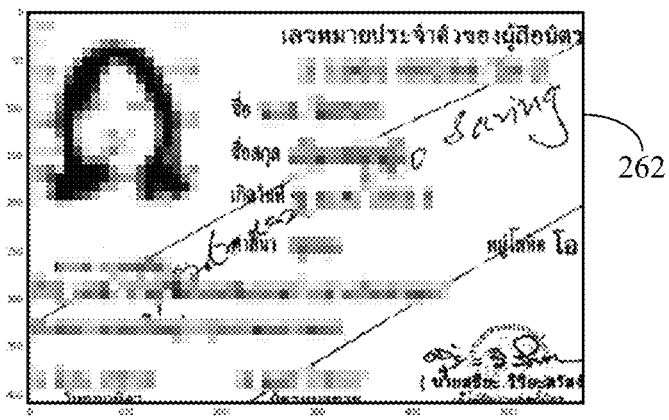

Referring to FIG. 1B, an illustration 150 depicts a first scanned image 152 of a front of the mock-up card 102 and a second scanned image 154 of a back of the mock-up card 102. As can be seen from a comparison of the illustration 100 and the illustration 150, scanned images are of poorer quality than the original image. Referring to FIGS. 2A, 2B and 2C depicting illustrations 200, 230, 260, respectively, the scanned images 202, 232, 262 are of poor quality, are very noisy and sometimes are written on or overwritten with identifying, categorizing or authenticating marks and then rescanned before being stored as the scanned images 202, 232, 262. In addition, as can be seen from layouts of the scanned images 202, 232, 262, the ID cards have gone through various updates leading to multiple generations of ID cards which have fields of interest at various locations in the layout (e.g., the photo 204 is in the upper left hand of the ID card 202 while the photo 234 is in the lower right hand corner of the ID card 232).

Figure 3:
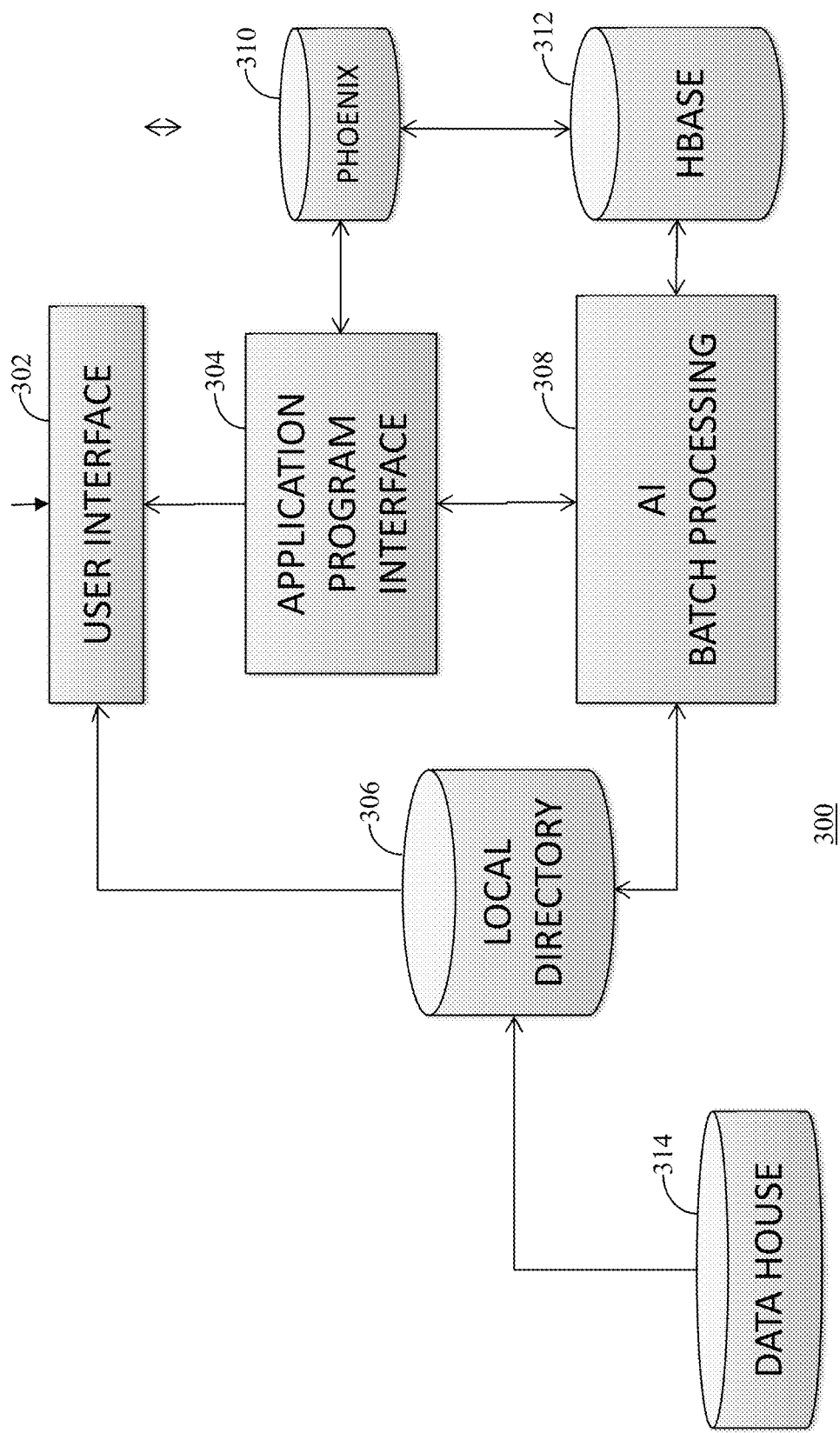
FIG. 3 depicts a high-level illustration of a system architecture for personal information extraction in accordance with the present embodiments.

Referring to FIG. 3, a high-level illustration 300 of an exemplary architecture in accordance with the present embodiments is depicted. A user interface 302 allows a user not only to enter commands to configure operation by way of an application program interface (API) 304 but also to view results of the operation from the API 304 and a local directory 306. The core of the architecture is an artificial intelligence (AI) based batch processing module 308 which, with the assistance of a relational data base engine 310 and its backing storage 312, facilitates and manage transaction-oriented applications, such as Apache Phoenix (an open source parallel relational data base engine supporting online transaction processing (OLTP) for Hadoop that uses Apache HBase as its backing storage) for manipulating data. The local directory 306 can access data in a data house 314 which, in accordance with the present embodiments, stores documents, such as ID scans 150, from which personal information data can be identified and extracted.

The AI batch processing module 308 extracts all available data according to an expected list of information to be extracted. The data is extracted from predefined text areas of the documents retrieved by the local directory 306 from the data house storage 314 and is stored in separate fields. The extracted information is stored in the backing storage 312, a data storage system with pre-defined structure such as HBase structure. The AI batch processing module 308 includes embedded logic to determine clarity of the extracted information.

In order to address the problem of scene text recognition or Optical Character Recognition (OCR), the AI batch processing module 308 includes a novel and robust data manipulation technique which combines feature extraction, sequence modelling and transcription into a unified framework. The system architecture illustrated in FIG. 3 is end-to-end trainable; includes image pre-processing steps such as rescaling, rotation, and denoising; calculates the level of confidence for each predicted output, which allows users to make real-time corrections; and generates an effective model which is practical for other real-world application scenarios.

Figure 4:
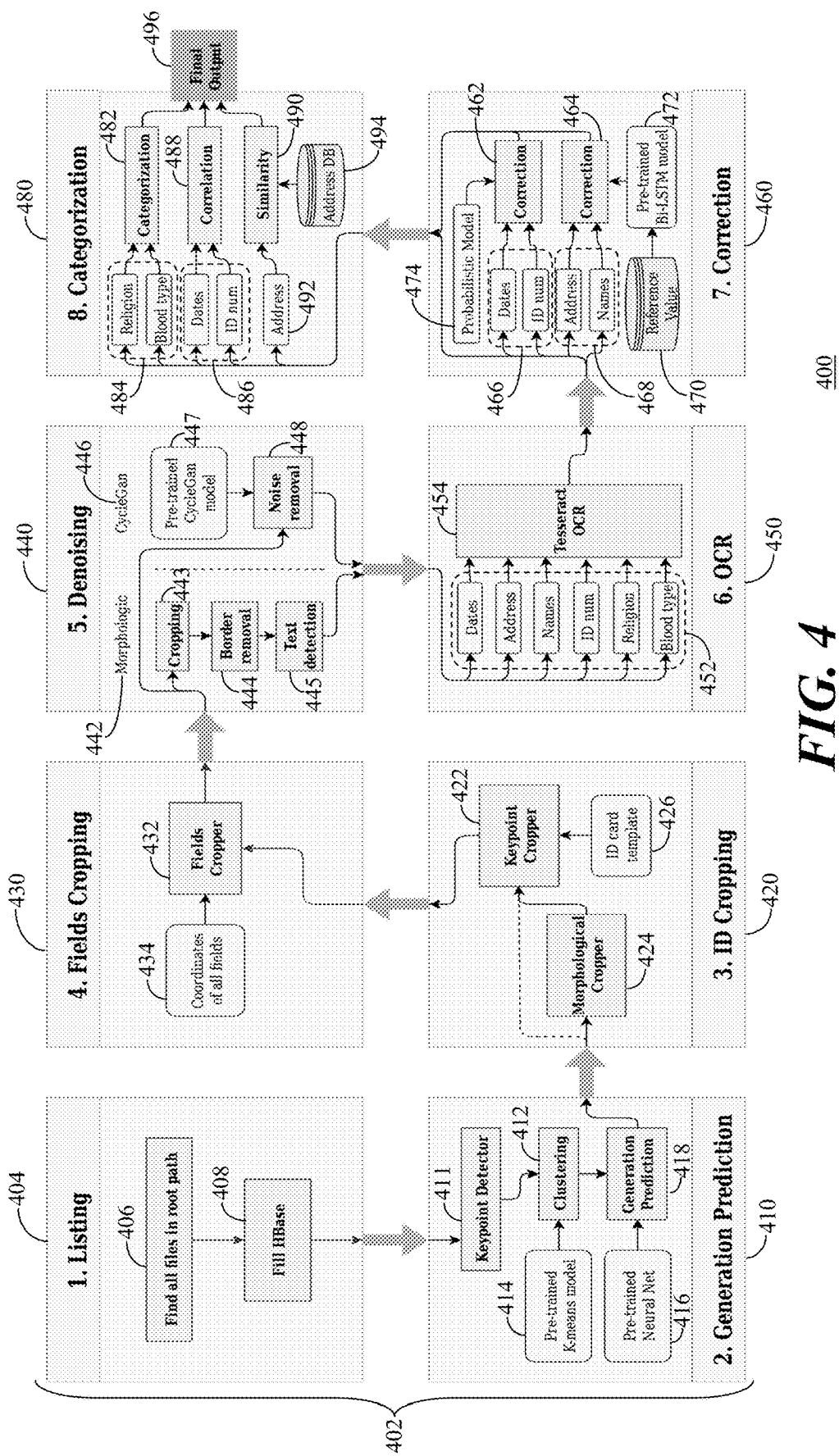
FIG. 4 depicts a flow diagram of the AI batch processing pipeline of FIG. 3 in accordance with the present embodiments.

Referring to FIG. 4, a flow diagram 400 depicts a pipeline 402 of the AI batch processing module 308 in accordance with the present embodiments. The AI pipeline 402 is completely flexible in the way about forty configuration parameters can be arranged, advantageously allowing a user to optimize the performance of the processing of the AI batch processing module 308 depending on requirements of input and output data. Each building block of the AI pipeline 402 is independent from one another, making it easier to adapt the AI pipeline 402 for various projects by activating or removing some blocks.

In accordance with the present embodiments, the AI pipeline 402 includes eight modules which can be enabled or disabled depending on a user's needs. A listing module 404 ingests metadata such as path data, resolution, device, creation data, image size, file size and other metadata by recovering file remote paths 406 from the local directory 306 while keeping their hierarchical level. All the data is then saved 408 into the HBase backing storage 312 in format suitable for the following processing. The objective of the listing module 404 is to scan the local directory 306 to find all images 406 and store the images 408 to the HBase backing storage 312.

A generation prediction module 410 aims to classify the scanned images into ID cards and non-ID cards and predict the generation of ID cards for locating various fields on the scanned image of the ID cards using a keypoint detector 411. The scanned images are then clustered 412 by noise level into different groups through use of a pre-trained K-Means model 414. The noise level grouping information is used for strategy differentiation. A pre-trained Neural Network 416 is used for generation prediction 418 in an "Apply" mode, the Neural Network 416 being able to be retrained with new types of documents outside of the pipeline such as multi-generational ID cards 202, 232.

An image cropping module 420 performs ID card cropping functions such as keypoint matching rotation and cropping of the scanned images. As the scanned images are rectangular-shaped ID cards, the image cropping module 420 includes a keypoint cropper 422 which operates in two modes: a lite mode where the data from the generation prediction 418 is cropped using only a morphological approach performed by a morphological cropper 424 to crop the data, and a full mode where the keypoint cropper 422 uses a fine-tuned KAZE approach along with the morphological approach performed by the morphological cropper 424 to crop the data. KAZE is an open source two-dimensional feature detection and description method and while the keypoint cropper 422 uses a fine-tuned KAZE approach, those skilled in the art will recognize that other scale invariant feature transform methods can also be used in the full mode operation.

The lite mode is much faster than the full mode and works well for good quality images. When the keypoint cropper 422 is operating in the full mode KAZE approach, the keypoint cropper 422 utilizes predefined ID card templates 426 for each type of ID card generation and requires some manual work to update the ID card templates 426 when new types of documents will be processed. The morphological cropper 422, however, can crop any rectangular shape from the original image.

After ID card cropping by the image cropping module 420, a field cropping module 430 splits the ID card image into smaller images for each field (e.g., name, address, issue date, etc.) separately by a field cropper 432. The field cropper 432 in accordance with the present embodiments, helps a later OCR module 450 to recognize text and numbers in each field by applying separate models for different fields.

Using the ID card cropped image from the keypoint cropper 422, the field cropper 432 computes a bounding box that contains text/number regions for each field and crops them from the main ID card image. The coordinates of each field 434 are saved in the HBase backing storage 312 and can be modified by a user in accordance with the ID cards or other formats used. All cropped field images are saved into folders with the same structure as the input dataset.

A denoising module 440 operates in two modes similar to image cropping module 420: a full mode which includes both morphological processing 442 and CycleGAN-modeled processing 446 and a lite mode which only includes the morphological processing 442. The denoising module 440 is configurable through a configuration file introduced through the application program interface 304 enabling the function of the denoising module 440 to be changed depending on input/output data and needs.

Any OCR extractor is sensitive to noise surrounding text images which can lead to reduced accuracy when images are not denoised before OCR extraction. In accordance with present embodiments, the denoising module 440 denoises fields after they have been cropped by the field cropping module 430 allowing handling as many noise categories as possible which advantageously increases precision of the denoising.

The morphological processing 442 includes cropping 443 edges of the image not containing text. Next elements on the border are removed 444 and small elements considered as noise are erased. Then a position of the text is detected 445 and surrounding elements are removed The CycleGAN-modeled processing 446 uses a pretrained neural network model 447 in apply mode to denoise 448 the image. CycleGAN-modeled processing 446, as those skilled in the art will recognize, is any modeled based processing which can translate data from one domain to another without a one-to-one mapping between the source and target domain. In accordance with the present embodiments, the CycleGAN-modeled processing 446 is completely designed and trained on the Thai ID card as well as fine-tuned in order to obtain high prediction quality. The model 447 can be retrained with other types of images in an offline mode.

An Optical Character Recognition (OCR) module 450 is used to extract content of each field 452 of the image and generate all possible candidates for the correct output. Different OCR models like digit and text models together with different focus features such as geometrical, sequential or character oriented focus features are used by the OCR module 450 through an iteration process to identify best results. In accordance with the present embodiments, the image data can be rescaled several times to reduce bias.

The optical character recognition of the OCR module 450 is implemented by a Tesseract OCR engine 454 using Tesseract retrained models. Those skilled in the art recognize that Tesseract is a high-quality optical character recognition engine and that operation of the Tesseract OCR engine 454 can be in accordance with other optical character recognition engines. The Tesseract OCR engine 454 receives character by character labelled data as input features. The Tesseract models can be retrained in an offline mode similar to the processes of other modules.

In accordance with the present embodiments, a correction module 460 includes methodology advantageously designed to correct and optimize 462, 464 outputs of the OCR module 450 for parts of the fields 466, 468 and aggregate them into a probable value. A confidence level is calculated at this stage for each separate field 464, the confidence level representing a probability that a value of the output of the OCR module 450 is a correct output.

Reference addresses are used as a knowledge database 470 for language model training (e.g., Bidirectional Long Short-Term Memory (Bi-LSTM)) 472 and name/address generation for correction 464 of bad quality text images of the fields 468. Dates and ID number fields (i.e., fields of only numbers) 466 are corrected 462 though probabilistic modelling 474.

A categorization module 480 categorizes 482 fields 484 with categorical values such as blood type and religion by calculating a similarity score between particular predefined category data and current data in the field. For numerical text fields 486, the text value (e.g., months in the date fields) are correlated 488 with predefined categories and are used for prediction of the data in the field. Similarity scoring 490 is utilized for prediction of data in fields 492 such as address fields, where reference values 494 can be used as source data.

The fields of categorized data 482, correlated data 488 and similarity-score predicted data 490 are combined to produce a final output 496. OCR methodology and general solutions in accordance with the present embodiments have different levels of completeness and, consequently, quality of text extraction. The embodiment described in accordance with the pipeline flow 402 is specially designed for Thai ID cards and focuses on each field separately to optimize accuracy of text extraction for the two languages (Thai and English) used on the Thai ID cards. However the modules 404, 410, 420, 430, 440, 450, 460, 480 and the arrangement of these modules in the pipeline flow 402 are not restricted to Thai ID OCR. Those skilled in the art will recognize that each of the modules 404, 410, 420, 430, 440, 450, 460, 480 of the pipeline flow 402 of the AI batch processing module 308 could be reused for other types of documents by modifying database and retraining models using the user interface 302 and the application program interface 304.

The main differentiation in terms of performance metrics is driven by quality of the images and by the field parameters (e.g., size, position, language). As the quality of scanned images improves (e.g., by using the modern devices like mobile phones), some steps and/or modules could be simplified or skipped. Thus, it can be seen that the present pipeline flow 402 is a flexible pipeline which can work in FULL or LITE modes where the FULL mode contains all optimization steps and the LITE mode is a reduced version of the FULL mode which outperforms the FULL mode in speed while providing the same accuracy for good quality images.

Figure 5A:
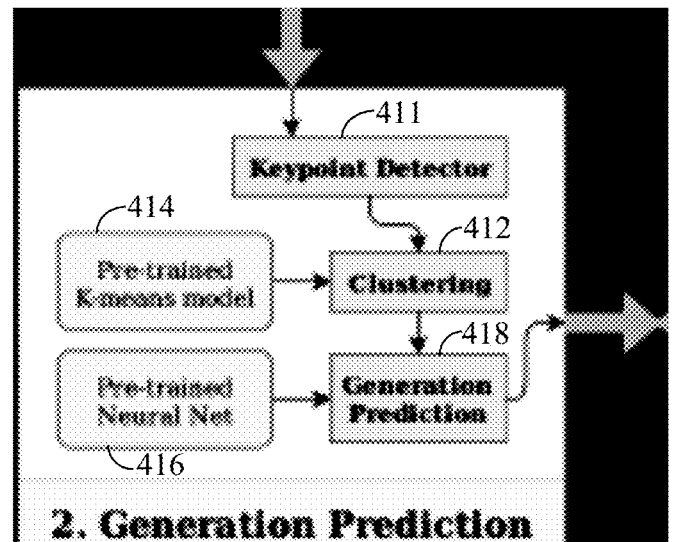
Figure 5B:
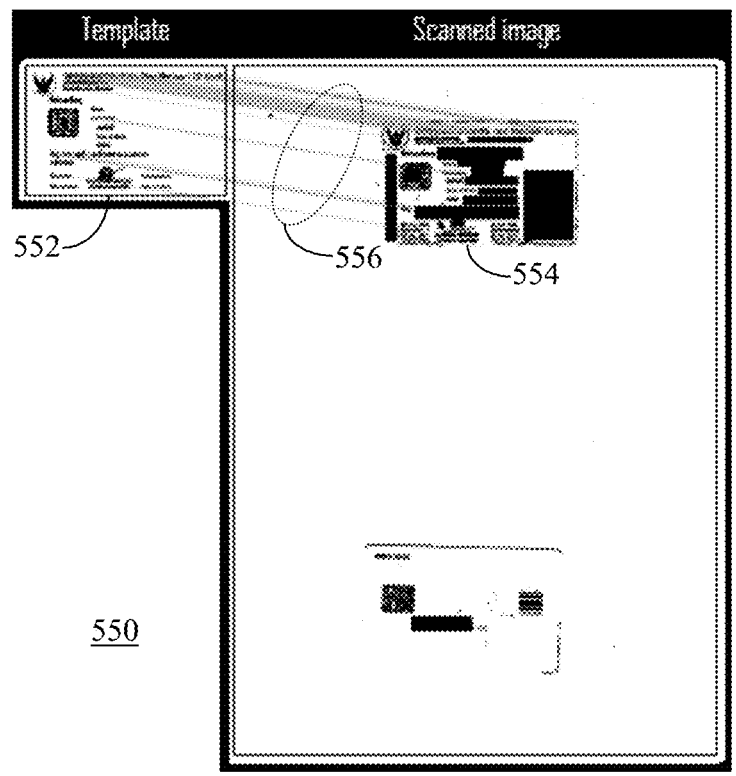

Referring to FIGS. 5A and 5B, illustrations 500, 550 depict operation of the generation prediction module 410 in accordance with the present embodiments. Referring to the illustration 500 (FIG. 5A), the generation prediction module 410 classifies the scanned images into ID cards and non-ID cards and predicts the generation of ID cards for locating various fields on the scanned image of the ID cards using the keypoint detector 411. When the dataset contains ID cards from multiple generations (e.g., the ID card 230 is a different ID card generation from the ID cards 200, 260 (FIG. 2)), it is necessary to predict the generation of the ID card as ID cards from different generations have different coordinates of field. Moreover, the ID cropping module 420 relies on keypoint matching using an ID card template which is different for each generation, thus the generation is needed to be predicted by the generation prediction module 410 before the keypoint matching of the ID cropping module 420.

The goal of the generation prediction module 410 as shown in the illustration 550 is to identify an ID card generation so that the generation template 552 can be used to process the images 554 so that the identified fields are more consistent and only the data from each field that is useful for a later task is kept. The keypoint detector 411

(FIG. 5A) performs feature extraction by transforming the image from its pre-processed shape (for gray scale images, a two-dimensional array where each value corresponds to intensity of the pixel) into vectors 556 that ideally contain only the information needed for classification. The keypoints detection algorithms and its descriptor used by the keypoint detector 411 are preferably designed and fine-tuned to be scale and rotation invariant.

The scanned images are then clustered 412 by noise level into different groups through use of the pre-trained K-Means model 414. The noise level grouping information is used for strategy differentiation. Once the image is represented as a vector, we still have to find the regions in the vector space which correspond to each class. Once each region of the vector space has been linked to a specific label, it is easy to predict the class of a new image based on where its feature vector lands in the vector space The pre-processing of the images consists of converting all the images to grayscale. For feature extraction during pre-processing, a KAZE-based approach fine-tuned with new hyperparameters is used to extract the transformation invariant features of the grayscale image data. These features are used to build a Bag of Visual Word model 414. After building the model 414, a small neural network (NN) 416 is trained to detect which region of the vector space belong to which class.

The output size of the KAZE algorithm depends on the resolution of the image as well as the kind of object present in the image. Some shapes in the image, such as corners, have more chance to be detected as a key point by the keypoint detector 502. To solve the size problem the idea behind Bag of Visual Word model 414 is to cluster into the same "bag" (cluster) the key points that share the same properties. The KAZE algorithm associates each key point to a vector which describes it as best as possible. Using the description vectors a K-means clustering algorithm is run on the list of all key point descriptors across all of the images in the dataset. Clustering 412 using the pre-trained K-means model 414 can count the number of key points in each cluster and normalizing it to determine the number of clusters. The number of clusters will then correspond to the size of the feature vector describing the image from which, using the pre-trained neural network 416, the generation can be predicted 418.

Pre-training in accordance with the present embodiments advantageously requires less training and more feature engineering and has been determined to achieve around 95% accuracy with only 200 badly labelled images per class.

Figure 6A:
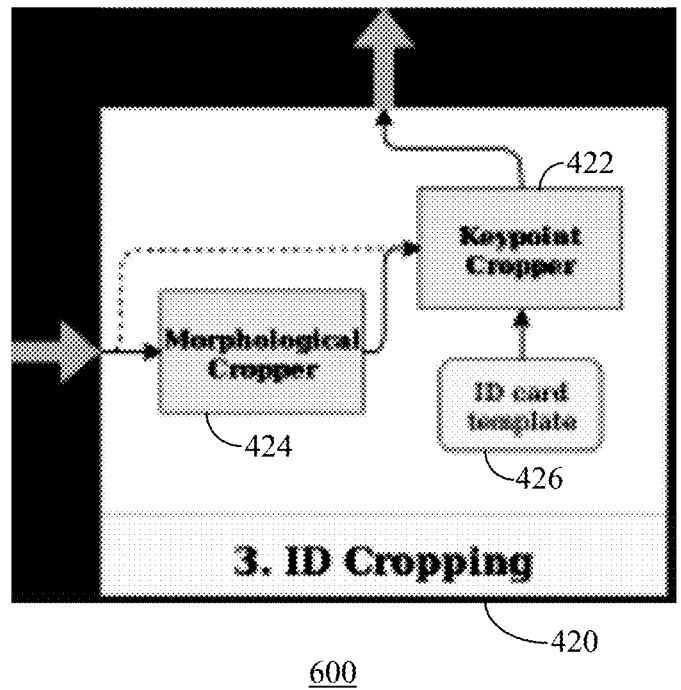
Figure 6B:

Referring to FIGS. 6A and 6B, illustrations 600, 610 depict operation of the image cropping module 420 in accordance with the present embodiments. The image cropping module 420 performs ID card cropping functions such as keypoint matching rotation and cropping of the scanned images by the keypoint cropper 422 using the template 426 of what an ID card looks like. A feature detection and description algorithm, such as a KAZE-based method, in the keypoint cropper 422 is used to extract important features in both the scanned image and the template.

Feature matching is performed by the keypoint cropper 422 by filtering the two sets of keypoints for denoising and then attempting to find a homograph between the two sets of keypoints. The idea of the ID card extraction is to use three "corner points" to describe the position of the card. Referring to the illustration 610 (FIG. 6B), these three points represent respectively the top-left corner 612, the top-right corner 614 and the bottom-left corner 616 of the ID card 620. The position of the ID card 620 is initially set at a top left corner of the scanned image, which corresponds to a position of the card in the reference template 426. Then, using keypoint matches, the keypoint cropper 422 determines rotation, scaling, and translation to apply to the three corners 612, 614, 616 to fit them to the position of the ID card in the scanned image. Once the coordinates of the three corners 612, 614, 616 of the ID card in the scanned image are known, an affine transform can be applied to extract a tight crop of the ID card.

While the rotation, scaling and translation could be directly applied to the scanned image itself, the ID card might go out of the frame of the image during the rotation, scaling or translation. Such out-of-frame issues could be avoided by adding a large border padding to the scanned image, but working with such an unnecessarily large image is not ideal. Also, while the homography matrix is computed from the keypoint matches directly and then used to extract the ID card from the scanned image, when the scanned image is very noisy, the keypoint matches can be quite poor and this direct computation method fails. Accordingly, a hybrid ID cropping in accordance with the present embodiments advantageously filters out bad matches using random sample consensus (RANSAC) while computing the transformation independently.

Thus, in accordance with the present embodiments, the rotation angle between the template and the scanned image is calculated using "keypoint vectors" defined as vectors between the first keypoint (e.g., the corner 612) and all other keypoints. By having matching keypoint vectors between the template 426 and the scanned image, the keypoint cropper 422 can compute the rotation and scale between the two images. From the keypoint vectors, a directed angle can be computed between each vector in the scanned image and its corresponding template vector. The rotation angle can then be determined by the median angle among the longest half of the vectors. In accordance with the present embodiments, shorter vectors which represent smaller errors are not taken into account because small errors can result in a large angle difference.

For ID card images of lesser quality, the cropping algorithm in accordance with the present embodiments may output an image that is not perfectly aligned with the outline of the card. Most of the time, this means that the cropped image is slightly rotated compared to the ID card. Moreover, the cropped image may sometimes have a white border at the bottom of the image such as ID card border 625 (FIG. 6B). Both of these situations can cause the fields not to be cropped correctly by the field cropping module 430, which will negatively affect the accuracy of the OCR system. In order to address the first situation, the keypoint cropper 422 utilizes a rotation correction algorithm to correct a rotation angle of the ID card as compared to the cropped image. In order to address the second situation, the keypoint cropper 422 utilizes a border correction algorithm which crops out the white border 625 at the bottom of the image. In accordance with the present embodiments, the keypoint cropper 422 corrects the rotation before the border correction algorithm, since it is easier to crop out the white border 625 once the ID card is properly rotated.

To correct the rotation of the cropped image, a barcode 630 present on the ID card is located and the image is rotated to align the barcode 630 vertically. As earlier generation ID cards (e.g., ID cards 202, 262) do not include a barcode, using the barcode 630 will only be applicable to those ID card generations having barcodes. Those skilled in the art will realize that other features having at least a portion of its outline with a generally vertical contour, such as photographs, can be used instead of the barcodes.

In order to use the barcode 630 for rotation correction in accordance with the present embodiments, the keypoint cropper 422 uses morphological operators to detect the position of the barcode 630. Since the barcode 630 is composed of many black horizontal lines, the keypoint cropper 422 applies a morphological closing with a wide, but short structuring element to highlight the barcode 630. The gaps between the horizontal lines of the barcode 630 are closed by applying a morphological closing with a tall but thin structuring element. Thereafter, small specks of noise between the horizontal lines are removed by applying a morphological closing with a small square structuring element.

After processing the image of the barcode 630 by the morphological closing, the keypoint cropper 422 can detect the black element corresponding to the barcode 630 by selecting the largest black element in the region of the ID card that should contain a barcode. To verify that the rectangle detected corresponds to the barcode 630, the aspect ratio of the detected rectangle is compared to an aspect ratio of an actual barcode on an ID card. If the value obtained is too far off, no rotation is applied.

Once the position orientation of the barcode 630 is obtained, a rotation of the original cropped image is applied to re-align the barcode 630. In order to prevent bad corrections, the rotation angle of such ID card cropped image rotation is limited to a maximum of five degrees in accordance with the present embodiments.

The border correction algorithm in accordance with the present embodiments is derived in response to observing that scanned images fall into two categories: a first type of image where at least a portion of an outline of a top or a bottom of the card is clearly visible (e.g., the scanned image 152 (FIG. 1B)) and a second type of image where no portion of the outline of the top of the card and the bottom of the card is visible (e.g., the scanned image 610). In accordance with the present embodiments, the border correction algorithm performed by the keypoint cropper 422 aims to not crop out too much of the scanned image. In order to achieve this aim, the border correction algorithm computes the proportion of black pixels on each horizontal line, starting from a top 640 of the scanned image 610. The calculated proportion of black pixels on each horizontal line is compared to two thresholds: a hard threshold and a soft threshold. The hard threshold is quite high and is meant to detect the first type of image where the outline is visible as a black horizontal line representing the visible outline should be present at some point. When the black horizontal line is detected, the image is cropped at that horizontal line that passed the hard threshold. The soft threshold is lower and is meant to detect the second type of image where the outline is not visible. Thus, the soft threshold will be surpassed when the text on the ID card is detected. In accordance with the present embodiments, when the text on the ID card is detected, the scanned image is cropped with a predetermined extra margin added, the predetermined extra margin being added to avoid cropping too close to the text on the ID card.

A scale factor is also determined using the keypoint vectors, where a median ratio of the length among a longest half of the vectors is used to determine the scale factor in accordance with the present embodiments. The longest half of the vectors is used since small errors in shorter vectors can lead to large scale differences.

For translation, the keypoints, not the keypoint vectors are used. More specifically, in accordance with the present embodiments, the two-dimensional translation is determined by computing the difference between a subset of matching keypoints and taking the median of the obtained list of translations.

To improve the speed of cropping good visible ID cards and to optimize the accuracy of poor quality of cards, the morphological cropper 424 provides an additional ID cropping approach in accordance with the present embodiments. The morphological approach of the morphological cropper 424 uses simple edge detection and morphological operators to detect a position of the ID card on the scanned image and can be used as an alternative to the keypoint-based algorithm of the keypoint cropper 422 or can be used in addition to the keypoint-based algorithm of the keypoint cropper 422. The morphological approach of the morphological cropper 424 is efficient on good quality scanned images with a clean background clearly separable from the ID card. Moreover, since the morphological cropper 424 doesn't use keypoint detection and matching, the morphological approach of the morphological cropper 424 is faster and more memory efficient than the keypoint-based algorithm of the keypoint cropper 422. The morphological approach of the morphological cropper 424 works well even if the ID card itself is very noisy, however it will likely fail when the background is also noisy.

The five consecutive steps of the morphological approach of the morphological cropper 424 include edge detection, morphological closing, morphological opening, finding contours and bounding box, and ID extraction. The edge detection step uses a Canny edge detector algorithm which results in a black and white image where all edges present in the scanned image are highlighted in white. The morphological closing step applies dilatation followed by erosion (i.e., morphological closing) to the image resulting from the edge detection using a circular kernel. The morphological closing has the effect of filling in gaps that may be present in the outline of the card after the edge detection step. The morphological opening step applies erosion followed by dilatation (i.e., morphological opening) using a circular kernel smaller than the one used in the morphological closing step. While the morphological opening step is not crucial and in some cases may not have any effect at all, it can be effective to remove unwanted small white elements that are connected to the ID card.

In the next step, the step of finding the ID card and computing the bounding box, the white blob that corresponds to the ID card is identified in the image from the previous step. While identification is easy for clear images, it can prove to be tricky when the image is noisy. Intuitively, the largest white blob should be selected as the ID card. However, in the dataset used, it was observed that the scanned image sometimes included both a front and a back of the ID. In these instances, the front of the ID card (i.e., the ID card image desired) is generally in a top part of the scanned image. Thus, it was defined that if the ratio between areas of a largest blob and a second largest blob is higher than a threshold (e.g., 0.8), it is assumed that the two blobs are different views of the same ID card and, thus, the topmost blob is selected. If the ratio is less than the threshold, the largest blob is selected. After having determined which white blob corresponds to the ID card, a minimum area bounding box is computed to obtain a region that will be cropped from the scanned image. Once we have a bounding box representing a position of the ID card on the scanned image, the last step is ID extraction. To extract the ID, three corner points from the bounding box (e.g., top-left, top-right and bottom-left) are used to compute an affine transformation to re-align the ID card on the scanned image.

While the morphological cropper 424 and the keypoint cropper 422 can be used separately for ID cropping, in accordance with the present embodiments, the ID cropper module 420 uses both methods together by applying first the morphological cropper 424 and then using the keypoint cropper 422 on the output of the morphological cropper 424. Combining both ID cropping morphologies in this manner, the input image provided to the keypoint cropper 422 is, advantageously, reduced in size enabling the keypoint algorithm of the keypoint cropper to run faster.

Figure 7A:
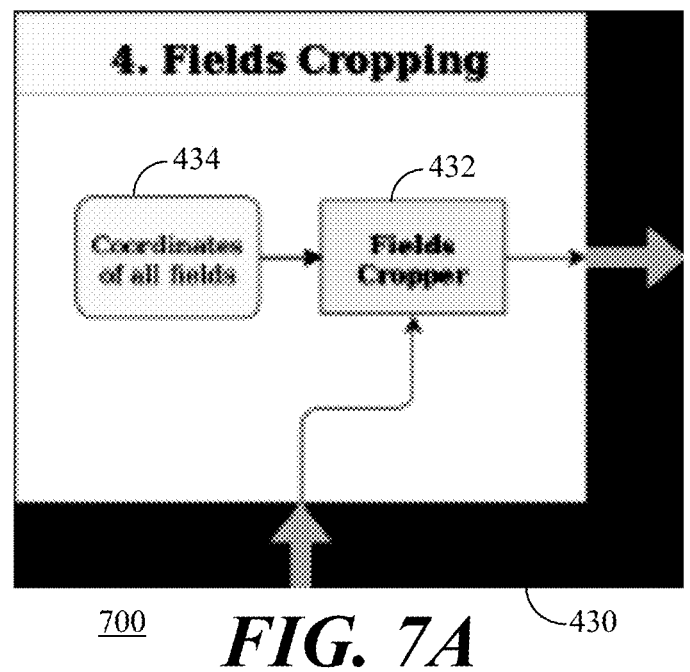

Referring to FIG. 7A, an illustration 700 depicts the field cropping 430 in accordance with the present embodiments. After ID card cropping by the image cropping module 420, the field cropping module 430 splits the ID card image into smaller images for each field (e.g., name, address, issue date, etc.) separately by a field cropper 432. The field cropper 432 in accordance with the present embodiments, helps a later OCR module 450 to recognize text and numbers in each field by applying separate models for different fields.

Figure 7B:

After the ID is cropped from the scanned image by the ID cropper 420, the fields containing different information are required to be cropped from the ID to be able to extract all of the necessary information from these fields. The fields are cropped based on absolute coordinates 434, which is why cropping ID cropping by the ID cropping module 420 is important before field cropping by the field cropping module 430. Using the ID card cropped image from the keypoint cropper 422, the field cropper 432 computes a bounding box that contains text/number regions for each field and crops them from the main ID card image. The coordinates of each field 434 are saved in the HBase backing storage 312 and can be modified by a user in accordance with the ID cards or other formats used. All cropped field images such as an exemplary field image 712 in an illustration 710 of FIG. 7B are saved into folders with a same structure as the input dataset.

Any OCR extractor is sensitive to noise surrounding text images which can lead to reduced accuracy when images are not denoised before OCR extraction. In accordance with present embodiments, the denoising module 440 denoises fields after they have been cropped by the field cropping module 430 allowing handling as many noise categories as possible which advantageously increases precision of the denoising. Image denoising is an integral part of any computer vision software because most software and algorithms are very sensitive to noise. Operation of the OCR algorithms' accuracy, in accordance with the present embodiments, becomes more robust and character recognition, including characters in alphabets such as Thai which include diacritical marks, is significantly enhanced by cleaning images from noise before performing OCR.

Figure 8A:
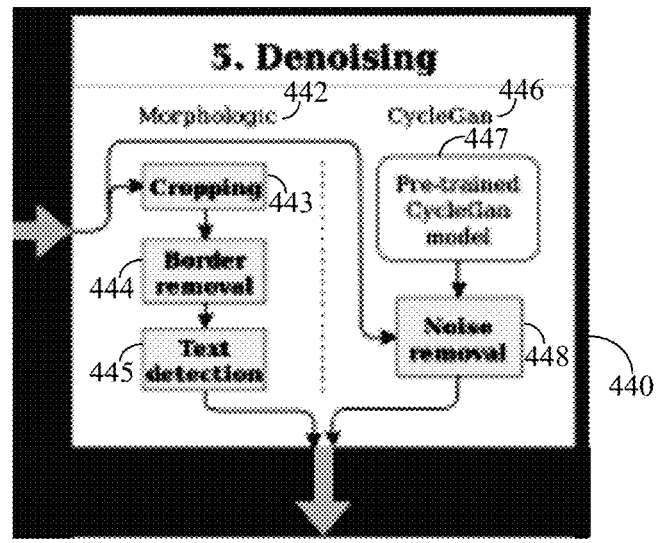

Those skilled in the art will realize that images may be denoised in either the cropped ID cards (e.g., the illustration 610) or in the cropped fields (e.g., the illustration 710). While the following discussion will focus on noise removal at the cropped field stage, the present embodiments may perform the noise removal at the cropped ID card stage or at both stages (i.e., after cropping the ID card and after cropping each field). Referring to FIG. 8A, an illustration 800 depicts the denoising module 440 which receives cropped field images from the field cropping module 430. The Denoising module 440 removes noise from the cropped field by either or both of the morphologic processing 442 and the CycleGan processing 446.

Figure 8B:
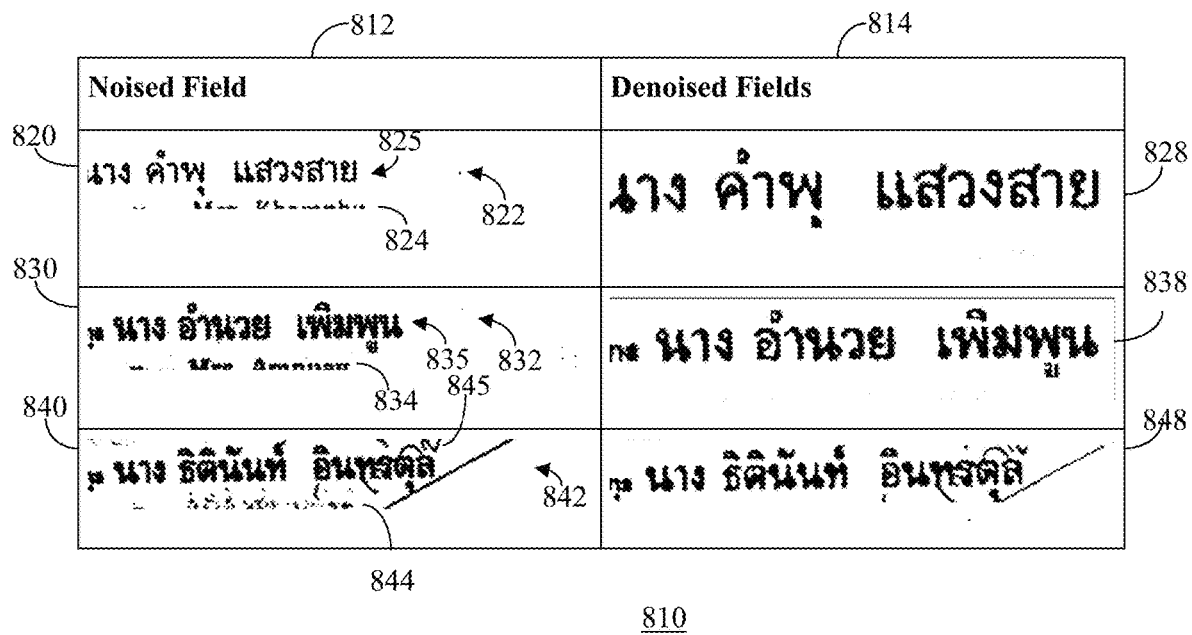

Referring to FIG. 8B, a table 810 includes a first column 812 depicting noised fields received from the field cropping module 430 and a second column 814 of the same fields denoised by the denoising module 440 in accordance with the present embodiments.

The cropped field images 820, 830, 840 include empty spaces 822, 832, 842 on the right side of the images 820, 830, 840 which is useless and can lead to a decrease in text extraction accuracy. One of the fundamental procedures of the morphological processing 442 is for the cropping stage 443 to remove the redundant space 822, 832, 842. The most important part of the denoising process performed by the morphological processing 442 is to remove small pixels that are noise such as items/pixels/noise on the borders by the border removal stage 444, for example removing items on the lower border 824, 834, 844. Lastly, a text detection stage 445 of the morphological processing 442 detects position of the text 825, 835, 845 and removes any surrounding items (e.g., mark 846) to derive clean denoised images 828, 838, 848.

As it is more important to keep all the characters when cropping the image than to lose some information, the cropping stage 443 detects the text 825, 835, 845 present in the images 820, 830, 840 by finding connected pixels in the image that resemble typography. Once the text 825, 835, 845 is detected, the cropping stage 443 discards the other components in the image (e.g., the spaces 822, 832, 842).

Next, as there is often noise on the border of an image, the connected components which have their center close to the border (e.g., the items on the lower border 824, 834, 844) are removed and small elements considered as noise are erased by the border removal stage 444. In accordance with the present embodiments, the cropping of the date fields often includes two fields, an English date field and a Thai date field, so the Thai and English birth dates and expiry dates are treated differently. In addition, small dots on the images with a size under a given threshold (e.g., the mark 846 on the cropped field 840) are removed. In accordance with the present embodiments, the small dot threshold is kept low in order to prevent removal of important points and symbols such as diacritical marks above or below the Thai letters which could lead to poor OCR accuracy.

Then a position of the text 825, 835, 845 is detected at the text detection stage 445 and surrounding elements are removed. The precedent processing stages 443, 444 of the morphological processing 442, facilitates detection of the main text area at the text detection stage 445. In accordance with the present embodiments, morphological image transformations are used to merge the letters close to each other and detect a component which is largest on the image. The image transformations are simplified by the operations being done on inverted black and white images (see FIG. 9). Text detection processing initially performs an erosion through the y-axis which will discard some small noise on the background, then the image along the x-axis is dilated to merge letters together. For Thai letters, an additional dilatation, a advantageously applied through the y-axis to keep the upper and lower diacritical marks or symbols. In addition, centers of the remaining connected components are located to define a y-axis range in which the characters are positioned by computing weighted average of the centers regarding the size of the components. The results of denoising are seen in the images 828, 838, 848 in the table 810.

Similar to the image cropping module 420, the denoising module 440 operates in two modes: a full mode which includes both the morphological processing 442 and the CycleGAN-modeled processing 446 and a lite mode which only includes the morphological processing 442. The Cycle-GAN-modeled processing 446 uses a pretrained neural network model 447 in apply mode to denoise 448 the image. While the model 447 can be retrained many types of images in an offline mode, the Pre-trained CycleGAN model 447, in accordance with the present embodiments, is completely designed and trained on the Thai ID card as well as fine-tuned in order to obtain high prediction quality. CycleGAN is a type of Generative Adversarial Network (GAN) network for image-to-image transformation and the CycleGAN-modeled processing 446 in accordance with the present embodiments uses two cycle-consistent generators to generate two sets of unpaired data.

In accordance with one aspect of the present embodiments, trained models are used for prediction. Keras is an open-source software library that provides a Python interface for artificial neural networks. Keras acts as an interface for the TensorFlow library and has a great class for saving and loading a model via keras.models.load_model. Keras models, however, have a fixed input which is hard to change and the network, in fact, uses the input dim as a feature. Hence, cropped fields of other sizes cannot be fed to the same network. In accordance with the present embodiments, the input images from the cropping module 443 are resized to the pre-trained network's input dimensions, the denoising is processed (e.g., border removal 444 and text detection 445), the denoised image is resized back to the original size of the input image, and the image is saved.

For noise evaluation by the border removal module 444 in accordance with the present embodiments, one or more of the following noise evaluation methods can be used: noise estimation, peak signal-to-noise ratio (PSNR), plotting structural similarity index (SSIM), and Laplacian filters.

For noise evaluation by Laplacian filters, noise estimation may be based on a kernel that is the subtract of two Laplace operators of an image. This way the kernel is insensitive to image edges. This class of noise estimation methodologies may, for example, be a conventional methodology utilizing a first Laplace operator $L_1$ as shown in equation (1) and a second Laplace operator $L_2$ as shown in Equation (2).

$$L_1 = \begin{array}{|c|c|c|} \hline 0 & 1 & 0 \\ \hline 1 & -4 & 1 \\ \hline 0 & 1 & 0 \\ \hline \end{array} \quad (1)$$

$$L_2 = \frac{1}{2} \begin{array}{|c|c|c|} \hline 1 & 0 & 1 \\ \hline 0 & -4 & 0 \\ \hline 1 & 0 & 1 \\ \hline \end{array} \quad (2)$$

The resulting kernel N is a subtract of the two Laplace operators of the image and is shown in Equation (3):

$$N = 2(L_2 - L_1) = \begin{array}{|c|c|c|} \hline 1 & -2 & 1 \\ \hline -2 & 4 & -2 \\ \hline 1 & -2 & 1 \\ \hline \end{array} \quad (3)$$

The result of this function (i.e., the kernel) is a sigma level which denotes the noise level. Also, the lower the sigma level, the better.

Peak Signal-to-Noise Ratio PSNR is an estimation of the image quality which is shown in terms of decibels (dB) (i.e., logarithmic decibel). In order to calculate the PSNR for noise evaluation by the border removal module 444, a mean squared error (MSE) difference of the noised image and the denoised needs to first be calculated. The PSNR will be output in dB and will show image quality, so the higher PSNR, the better. Plotting the structural similarity index of the two original and denoised images are useful for human judgment in the noise removal process.

The Laplacian filter is used in edge detection by the border removal module 444. However, it is very sensitive to noise in images so it is often used with a Gaussian filter. In order to estimate the noise in an image, the Laplacian filter is used without the Gaussian filter to estimate noise in the image.

Figure 9:
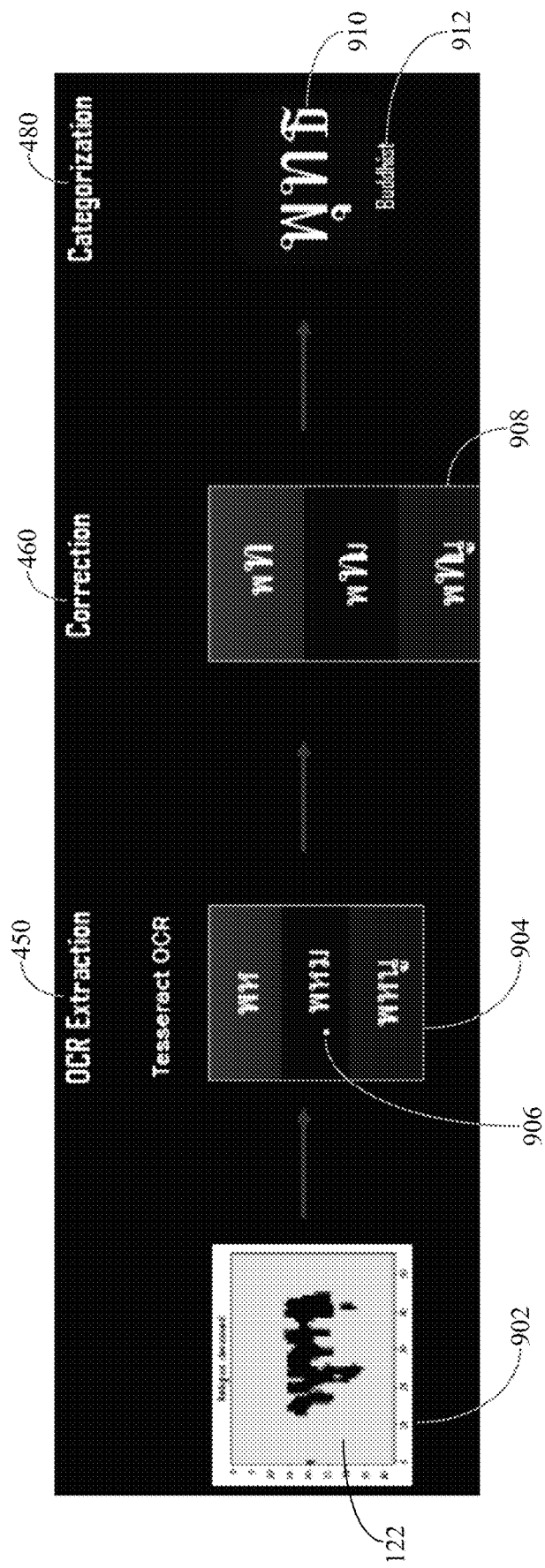
FIG. 9 depicts a flow illustration of an overview of the text extraction pipeline in accordance with the present embodiments.

Referring to FIG. 9, a flow illustration 900 depicts an overview of the text extraction pipeline in accordance with the present embodiments. An input image 902 of a religion field 122 is provided to the OCR module 450 which selects a character image 906 among optical character recognized images 904. The correction module 460 then generates corrected images 908 for categorization by the categorization module 480. As the field is the religion field 122, a field 484 with categorical values, the categorization module 480 calculates a similarity score between particular predefined category data (i.e., the most common religions in Thailand) and the corrected images 908 to find a closest match 910 which is "Buddhist" 912.

Figure 10A:
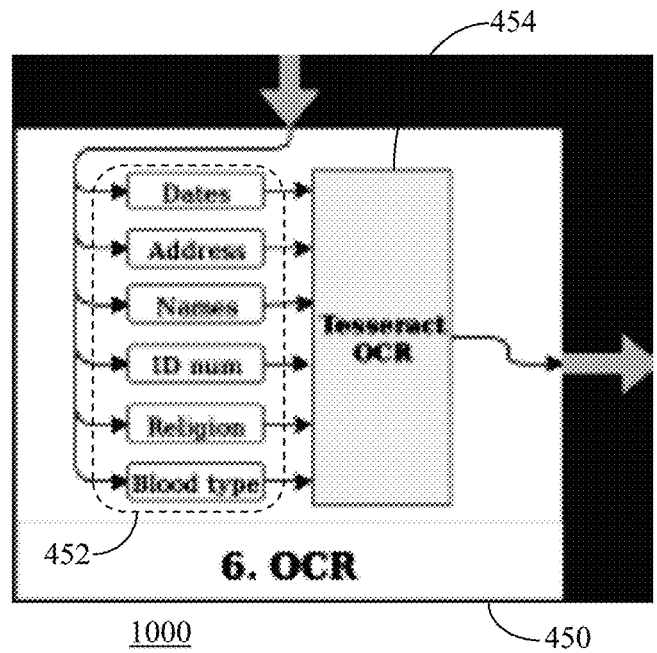

Referring to FIG. 10A, an illustration 1000 depicts the OCR module 450. The OCR module 450 utilizes the Tesseract OCR engine 454 to extract characters from denoised field images resulting from the previous steps. The Tesseract OCR engine 454 is a neural-network based OCR engine developed by Google LLC of Mountain View, California, USA.

Figure 10B:
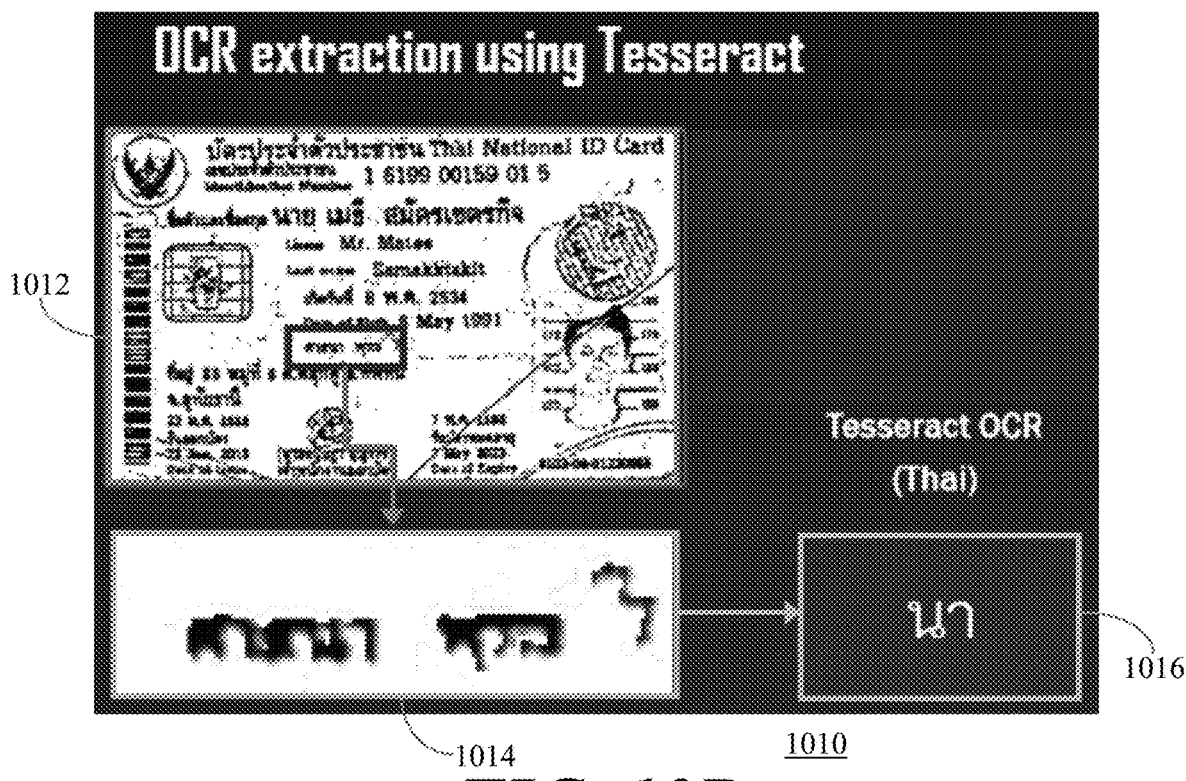
Figure 10C:
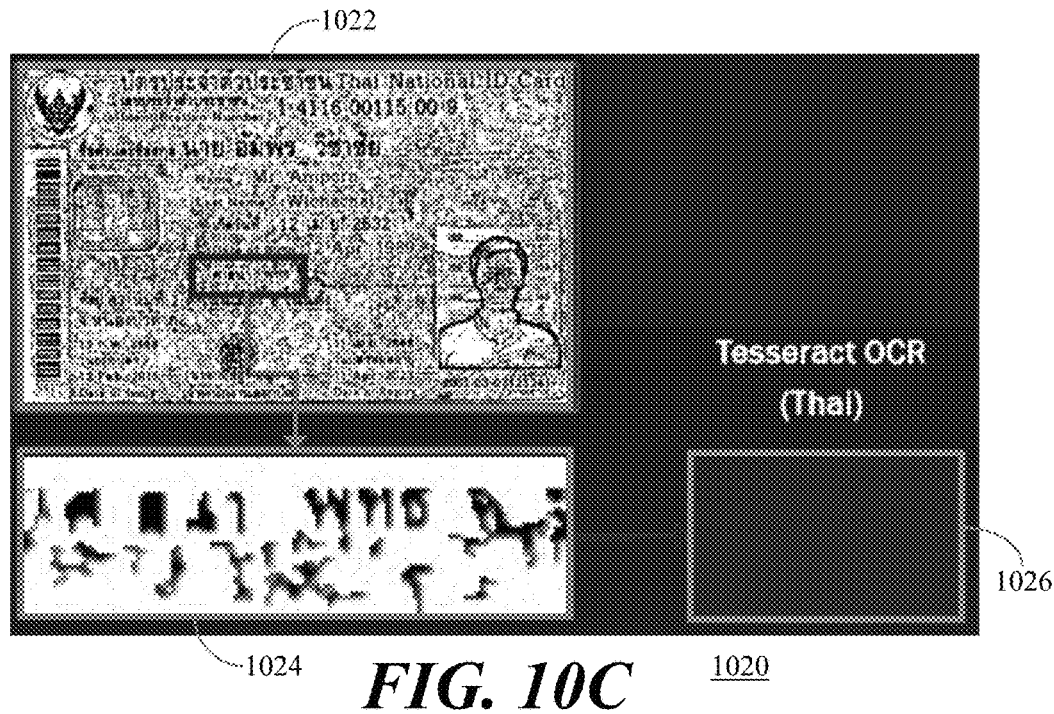
Figure 10D:
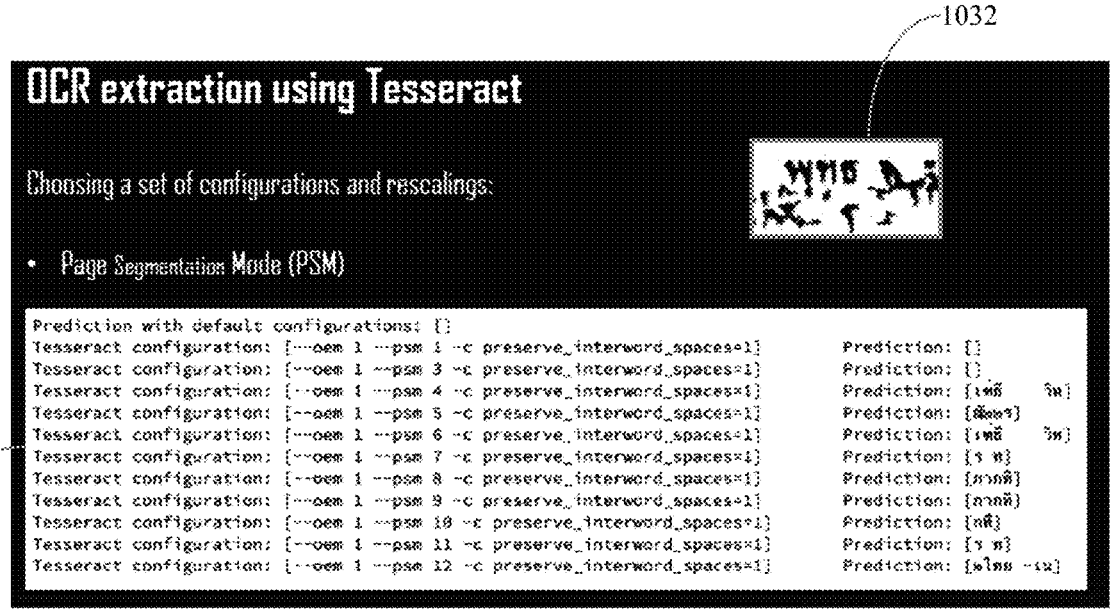

Referring to FIGS. 10B and 10C, illustrations 1010, 1020 depict scanned images 1012, 1022, denoised field images 1014, 1024 input into the Tesseract OCR engine 454, and resultant Tesseract OCR images 1016, 1026. The scanned image 1012 is a good quality image and when denoised, the low background noise preprocessed field 1014 is good quality when inputted into the Tesseract OCR engine 454 and the predicted result is a clear Tesseract OCR image 1016. Unfortunately, the predictions by the Tesseract OCR engine 454 are often far from perfect, and combined with the low quality of images, the results are impossible to use. The illustration 1020 (FIG. 10C) depicts a bad quality scanned image 1022 and even after preprocessing, including denoising, the field image 1024 is a bad quality high noise field image resulting in a predicted resultant Tesseract OCR image 1026 which is impossible to use. Thus, in accordance with the present embodiments, the Tessearct OCR engine 454 is modified to make specific predictions based on the targeted field 452.

Referring to FIG. 10C, an illustration 1030 depicts OCR extraction of a field 1032 in a page segmentation mode of multiple predictions 1034 in accordance with the present embodiments. The page segmentation mode (PSM) generates multiple predictions 1034 for each inputted field image 1032 by using a predefined set of configurations and a predefined set of rescalings to apply to the inputted field image 1032. For example, between three to fifteen different predictions 1034 are produced for an image 1032 depending on the complexity of the field 452 to predict. In accordance with the present embodiments, as many predictions as possible are made, each prediction providing different information on the real value to be extracted. Then, by aggregating all the results of the multiple predictions, a good prediction can be identified.

Figures 10E, 10F:
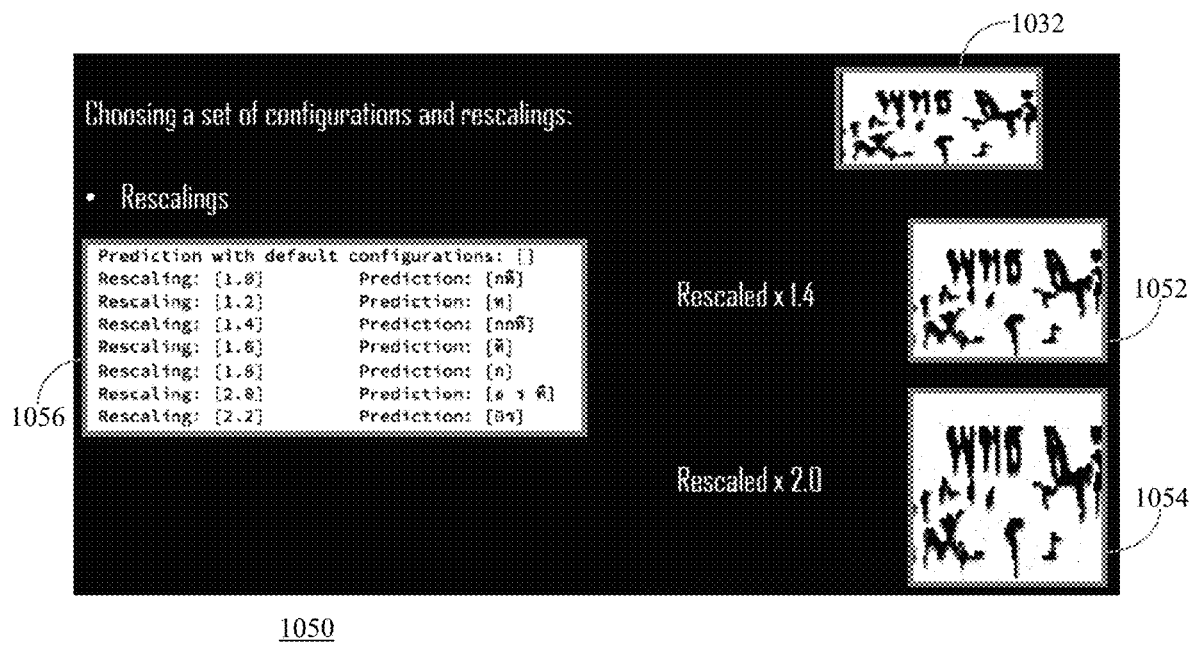

Referring to FIG. 10E, an illustration 1050 depicts more details of the rescaling of the field 1032 where the field is rescaled to 1.4 times (field 1052) and 2.0 times (field 1054). In accordance with the present embodiments, predictions are made at each rescaling as shown in the table 1056. After exemplary rescalings and predictions, the most effective sets of parameter can be determined using Grid Search, a technique which tends to find the right set of hyperparameters for a particular model, as well as speed tests to choose the number of predictions to make. Then, the list of parameters for each of the fields 452 resulting from the Grid Search are saved to be reused for control of the Tessearct OCR engine 454 when processing each field 452. Referring to FIG. 10F, an illustration 1070 depicts a table 1072 showing PSMs 1074, resealing factors 1076 and number of predictions 1078 for the first and last name fields 1080, the religion field 1082 and the blood type field 1084.

Tesseract models were retrained in accordance with the present embodiments in order to have results more fitted to the presented data. This was necessary as the basic Thai language model offered by conventional libraries were not advanced enough for processing in accordance with the present embodiments. The Thai OCR pipeline takes a document as input and produces text prediction as output. So, it was required to not only develop an extraction process, but also to develop post-processing processes.

Two-Line Address Field Tesseract Example

In line with FIGS. 10A to 10F, the two-line address field (lines 114a and 114b (FIG. 1A) were extracted as an example. The OCR extraction process in accordance with the present embodiments is relatively straight-forward as the Tesseract library is called with multiple parameters. The only difference with other fields is that two different images are used—one for each line—instead of a single image. This does not have significant impact on the code as the two images are treated sequentially and then the extracted text is aggregated to form the whole address. This method is advantageously used, as extracting both lines at the same time with Tesseract gave unfavorable results.

The added value of the extraction process is the two naïve text correction methods performed on the extracted addresses in order to have a sound result to work with in the future steps.

After benchmarking the different models which can be used by Tesseract, it was seen that their performance differs depending on the generation of national ID cards being predicted. The Tesseract models benchmarked include the -psm models (also defined as "Page Segmentation Modes" (PSM)) which help improve the similarity of the result depending on the nature of the text in the image.

OCR on generation v3.0 and v4.0 ID cards performed better when using only two PSMs: mode 7 and mode 13. Mode 7 is defined as "Treat the image as a single text line" in the Tesseract documentation and mode 13 is defined as "Raw line. Treat the image as a single text line, bypassing hacks that are Tesseract-specific". When treating the generation v5.2 ID cards, OCR results were improved by adding a third mode: mode 6. Mode 6 is defined as "Assume a single uniform block of text". In the final case of generation v5.1 ID cards, it was found that the extraction process is invariant to the set of PSMs used. Thus, for the sake of clarity and consistency, both types of generation 5 ID cards (i.e., v5.1 and v5.2) were processed using all three models: mode 6, mode 7 and mode 13.

On top of using different configurations, the image is rescaled multiple times and each one is fed to the different Tesseract models mentioned above, thus providing more data to work with while attempting to reconstruct the best possible address. For example, the image may be rescaled four times, providing 5 images from scale 1:1 to scale 3:1, inclusive, with a step of rescaling of 0.5.

For speed reasons, a "light mode" was also implemented in order to scale the software to be able to run it on all of the images, but also in order to enable creating a real-time extraction pipeline (which would give the results for a single image as fast as possible). The only changes in the light mode are the number of PSMs used (only mode 7 and mode 13 are used for all generations) and the number of times the images are rescaled (only up to scale 2:1).

Following the extraction of the text from the images, both lines of the two-line address field were concatenated in order to form a complete address, which makes more sense as it was desired to treat the whole text as a single semantic entity. However, the extracted text is not perfect, thus quick corrections using three types of regexes needs to be performed: Blacklist (this regex deletes all special characters that do not make any sense in the context of a Thai address (e.g. &, %, ", . . . )); Space List (this regex sets a list of characters that should not be completely deleted, but be replaced by spaces as they most probably link two words together (e.g. ;, ., . . . )); and Numbers (this regex recognizes the formatting of numbers in addresses and changes these numbers to a special tag '0', and this regex is useful to mark the position of numbers as they follow a different extraction process).

After these three regexes are applied to the text, a last regex is defined to replace very similar characters that are frequently mispredicted by Tesseract (e.g. \textthai{ อ̃ }→\textthai{ อ }, \textthai{ ด }→\textthai{ ต }, . . . ). These mispredictions and their replacement text is identified following a qualitative analysis of the extracted text.

Once the regexes have been applied, corrections of common errors can be performed, once again defined by looking at some predictions made by Tesseract. Three rules can be applied that cover the three main problems faced with our results: first, only keep relevant words, which means all one-letter words that are not keywords are removed as they likely represent noise; second, consecutive occurrences are deleted as no word appears twice back-to-back in an address; and third, three address groups are defined based on length. When performing statistical analysis on the eight million addresses provided in the ReferenceValue table, it was seen that 90% of the addresses (between the 0.05 and 0.95 quantiles) have between thirty-eight and ninety characters, and between seven and fourteen words.

To keep a margin of error, short addresses are defined as having less than thirty characters or less than five words. When all concatenated addresses extracted from Tesseract are short addresses, the image is considered unusable (meaning no address can be detected in the cropped and denoised fields) so no prediction is made.

On the other hand, long addresses have more than sixteen words and are considered noisy. Thus, it was considered to apply a word tokenizer is applied on such long addresses before running the usual pipeline. In addition, it was considered to use the LSTM module in order to perform correction on the addresses. However, in all benchmarks performed, no address was long enough to test this method and determine its effectiveness.

As explained briefly in regards to the Regex Text Correction discussion hereinabove, all the numbers were changed to the special tag (0) in order to avoid taking them into account in the correction. This was also implemented with the Bi-LSTM training and prediction in mind to avoid having windows with only numbers (as seen in the Address Theory part, numbers in Thai addresses can be quite long).

The idea of splitting both extraction processes (i.e., number extraction and letter extraction) follows from the fact that Tesseract models perform worse on numbers than on letters. To palliate to this problem, use of specially trained models was attempted in order to predict these numbers, following what is done for the extraction of thirteen-digit ID numbers. However, these models were only trained to recognize digits and this created another problem where the model always tried recognizing groups of thirteen digits, changing some letters to numbers.

To avoid this problem, a strategy is implemented similar to the text extraction process, using multiple Tesseract models and aggregating the results afterwards to form a single pair of numbers. After some benchmarks, the three best observed page segmentation modes (PSMs) (in order of similarity) were: PSM 10 ("Treat the image as a single character."), PSM 7 ("Treat the image as a single text line.") and PSM 8 ("Treat the image as a single word."). However, this method still did not provide results that were satisfying enough.

Even though utilizing a single PSM goes against the idea of correcting the input that was wanted to implement, the final solution only uses a single PSM (10) as this solution provides better results. The following steps of Regex Cleaning and Formatting are performed on this single output before merging the result with the output of the text correction 464 (FIG. 4) at the end of the address extraction pipeline right before saving the final prediction to the database.

Regex Cleaning

Once again, the easiest cleaning solution to implement uses regexes. Three operations are performed on the extracted address line: first, all special characters similar to slashes (e.g. {, \, . . . ) are replaced by a slash (/); second, all combinations of slashes and spaces are replaced by simple slashes in order to compact the numbers; and third, as the interest is only in numbers, every character that is not a digit, a slash or a dash is replaced by spaces.

Formatting

Once the cleaning has been done, the next step is to detect the number of groups of numbers (either one or two in most cases). This step is quite straight-forward as the number of spaces are simply counted and the biggest space block is defined as the separation between the groups. If the space block's size is larger than three or more spaces, the numbers are split into two groups. Otherwise, only a single block of numbers is kept. Each of the groups are then formatted into groups having four numbers maximum, which is then padded with slashes (by default) or dashes (if present), depending on the situation. Thus, some possible examples of results are: 894/23-12; 2836/4893/354; 35-67; . . . .

Merging Back the Final Address

Now that there are only either one or two groups of numbers, the groups of numbers are merged back into the full predicted address. Note that this merging step is only included in this part for clarity; merging in accordance with the present embodiments is done only when all the correction and categorization steps have been performed.

To merge back the numbers, the digit tags created by the address text extraction module are detected and replaced by the extracted numbers. If no tags are detected but extracted a group of numbers still exist, the group of numbers is simply added at the beginning of the string, which is where the number tag is usually located.

Once this is done, a final cleaning needs to be performed as the regexes used are too simple. Indeed, it needs to be assured that no single slashes are surrounded by any numbers, or no slashes are at the beginning of the number group (i.e., a leading space with no numbers) or at the end of the group (i.e., a trailing space with no numbers).

After this final cleaning step, the address is ready to be saved. The OCR aggregation step tries to smartly aggregate all valid strings out of the ten-to-fifteen strings that were extracted using Tesseract in order to form the best possible single address (this will also allow comparison of the basic address extraction process with the baseline output from single Tesseract models).

The STAR Multiple Sequence Alignment (MSA) algorithm is used, a heuristic approach altered a little in order to apply it to Thai addresses instead of DNA sequences (its intended use is finding common patterns between proteins). Note that the STAR algorithm is a heuristic approach, meaning that it runs fast and gives good enough results, but the answer is not guaranteed to be optimal.

The STAR algorithm uses a progressive alignment approach, meaning the process is started by aligning all ten-to-fifteen Thai addresses using a series of pairwise alignments. Initially, two similar addresses are aligned, and then this alignment is fixed. Then a third sequence is chosen and aligned to the first alignment and so on. The process is iterated until all addresses have been aligned.

Next, the address that is most similar to all other addresses is found and then used as the center of a "star" to align all the other addresses to it (hence the name). To calculate the "center" address, all the pairwise alignment scores are computed using edit distance. The address with the highest score (i.e., the lowest mean edit distance) is chosen as the "center" address.

Once the "center" address has been determined, the optimal pairwise alignments between this address and all the other addresses is calculated. To illustrate this approach, a textbook example is provided as an example. First, suppose S1 is the center address. The optimal pairwise alignments used are determined as follows: suppose the first alignment is S1 and S2, and then S3 is added. Since two spaces follow S1 in the alignment of S1 and S3, two gaps are added at the end of S1 and S2 so that all strings have the same length. Then all the alignments are merged using the "once a gap, always a gap" principle, meaning that gaps are never removed once they are included in the alignment. Thus, after adding the remaining strings, the final consensus address is constructed by taking the mode (most frequent value) of each column in the final multiple sequence alignment produced by the STAR algorithm. For the example given above, the consensus sequence produced would be ATGCGGATT. Note that the gaps (-) that appeared in the consensus are removed if it is the mode of a column.

Fine Tuning Tesseract Predictions

The approach used to increase the accuracy of the result is to make many different predictions on the same image, and these will then be processed so that the most likely value is finally chosen as the final prediction. Indeed, by using a library with different configurations, it is possible to make different predictions which, depending on the chosen set of parameters, can be more or less accurate. So, for each processed image, a list of the most efficient PSMs to use is initially defined.

Before feeding images to Tesseract, the scale of each image is modified by a list of factors predefined according to the measured performances. Although counter-intuitive for the human eye, changing the scale of the image allows Tesseract to obtain very different predictions by significantly modifying the data.

Figure 11A:
Figure 11B:
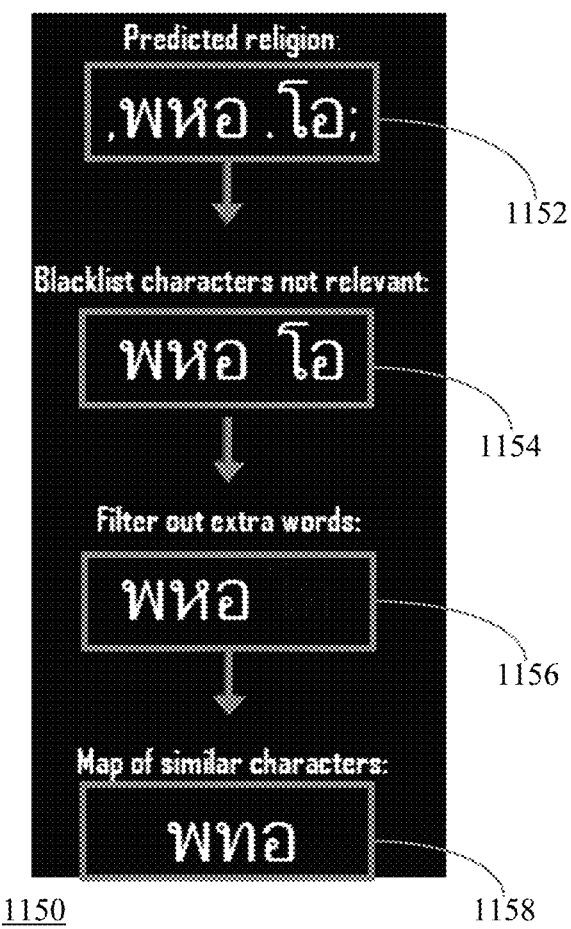

The idea is then to make as many possible predictions as possible, each sometimes giving different information on the real value to be extracted. It will be by aggregating the different information on the real value to be extracted that a good prediction can be made. Naturally, to counterbalance this with the performance of the system and its scalability, it is necessary to choose a number of predictions large enough to allow a reasonably accurate result, but small enough for the extraction process to be fast.

xxAs mentioned previously, in accordance with the present embodiments, the Tessearct OCR engine 454 is modified to make specific predictions based on the targeted field 452. Referring to FIGS. 11A and 11B, illustrations 1100, 1150 depict a post-Tesseract cleaning operation of the correction module 460 in accordance with the present embodiments. As discussed hereinabove, because of the amount of noise in some images, the Tesseract OCR 454 will try to predict characters, which may result in punctuation or extra characters in the predictions. To correct this, predictive cleaning functions are implemented in accordance with the present embodiments to make use of the particular features and characteristics of each field. The illustration 1100 depicts an exemplary un-cleaned religion field and the flow diagram 1150 depicts a predictive cleaning function in accordance with the present embodiments. At step 1152, in response to the field to be cleaned being a religion field with a limited number of possibilities, the portion of the field which could indicate a religion is selected. At the second step 1154, characters within the field that are not relevant to the possible religion characters are removed. The remaining characters should be whole words. At step 1156, words that do not indicate any religion are filtered out. And at step 1158, the remaining characters are mapped against characters of possible religions.

Figures 12, 13A:
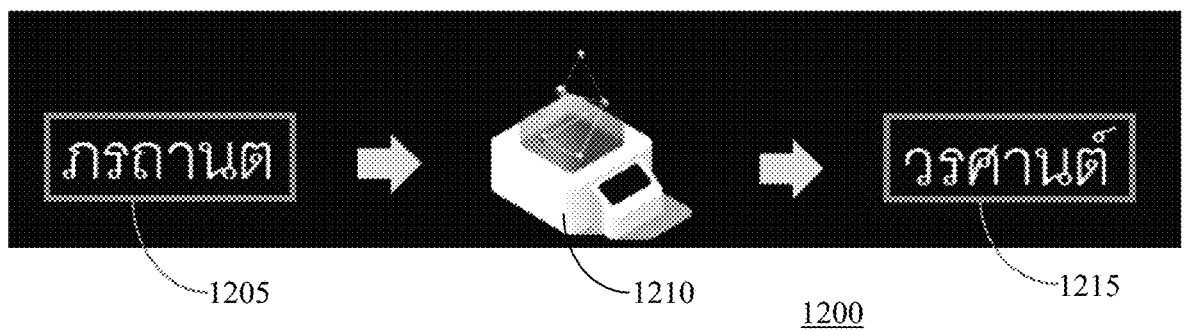

FIG. 12 depicts and illustration 1200 of spellchecking 464 by the correction module 460 in accordance with the present embodiments. The illustration 1200 depicts an overview of the spellchecking where a spell checker 1210 has Thai text 1205 inputted thereto and outputs corrected Thai text 1215. The spell checker 1210 is designed to correct small errors and spelling mistakes.

An exemplary spell checker 1210 is described hereafter. The exemplary spell checker implemented in the correction 464 is designed to choose a most likely spelling correction for a word w. There is no way to positively know the correct spelling, which suggests that probabilities should be used to identify the most likely correct spelling, i.e., to find a spell check correction that maximizes a probability of being correct. The probability P(c/w) that occurring text "w" is the corrected text "c" for all possible correction candidates is shown in the equation (4):

$$\text{Argmax}_{c \in candidates} P(c|w) \quad (4)$$

Using Bayes theorem, the equation (4) is transformed to the equation (5):

$$\text{Argmax}_{c \in candidates} P(c)P(w|c)/P(w) \quad (5)$$

When the probability P(w) is set to '1' in equation (5) for each candidate, the probability that the corrected text "c" is correct is maximized as shown in equation (6):

$$\text{Argmax}_{c \in candidates} P(c)P(w|c) \quad (6)$$

Thus, the probability of a correction being the right one can be determined by multiplying the probability that "c" appears as a word of English text, i.e., the language model P(c), by the probability that "c" is the good correction, i.e., the error model P(w|c).

FIGS. 13A, 13B and 13C depict tables 1300, 1330, 1360 of categorical fields that, in accordance with the present embodiments are categorized by categorization 482 by the categorization module 480 as the categorical fields of the tables 1300, 1330, 1360 have been determined to have a limited number of correct values. Table 1300 includes possible religions in Thai 1305 and in English 1310. The table 1300 also shows the frequency of occurrence 1315 of each of religion within the Thai population. In a similar manner, table 1330 includes possible personal titles (e.g., "Mr.") in Thai 1335 and in English 1340. The table 1300 also shows the frequency of occurrence 1345 of each of the possible titles within the Thai population. Likewise, table 1360 includes possible blood types in Thai 1365 and in English 1370. The table 1360 also shows the frequency of occurrence 1375 of each of the blood types within the Thai population.

Figure 14A:
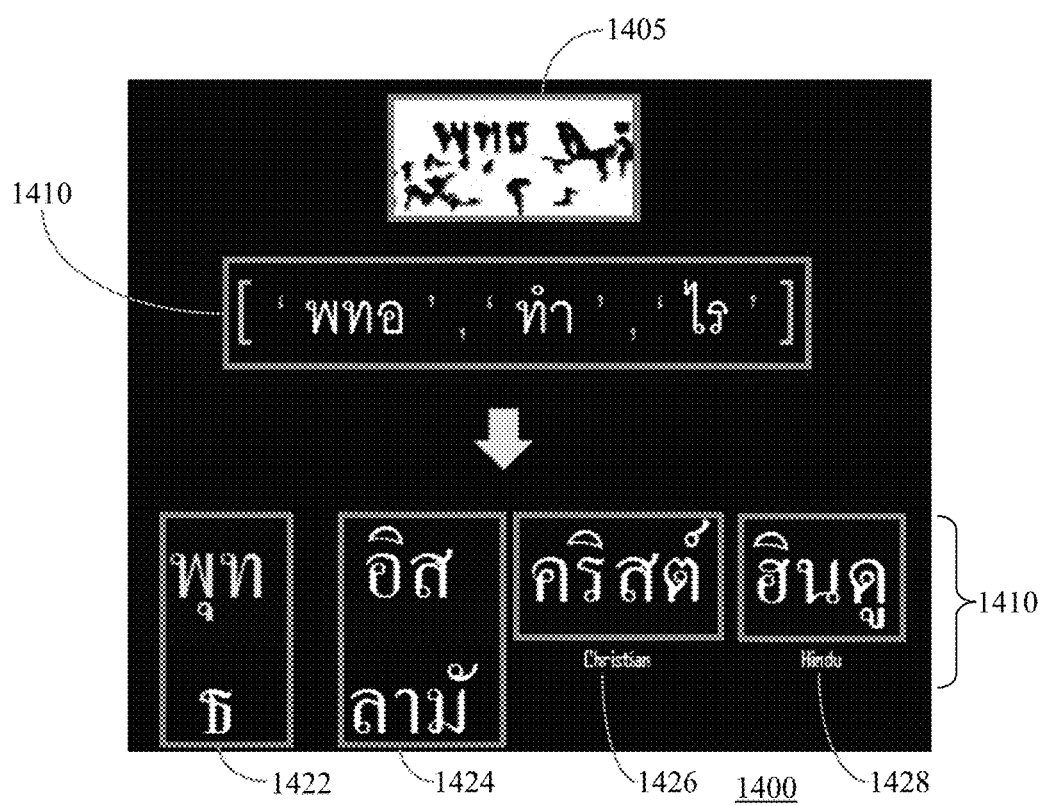
Figure 14B:
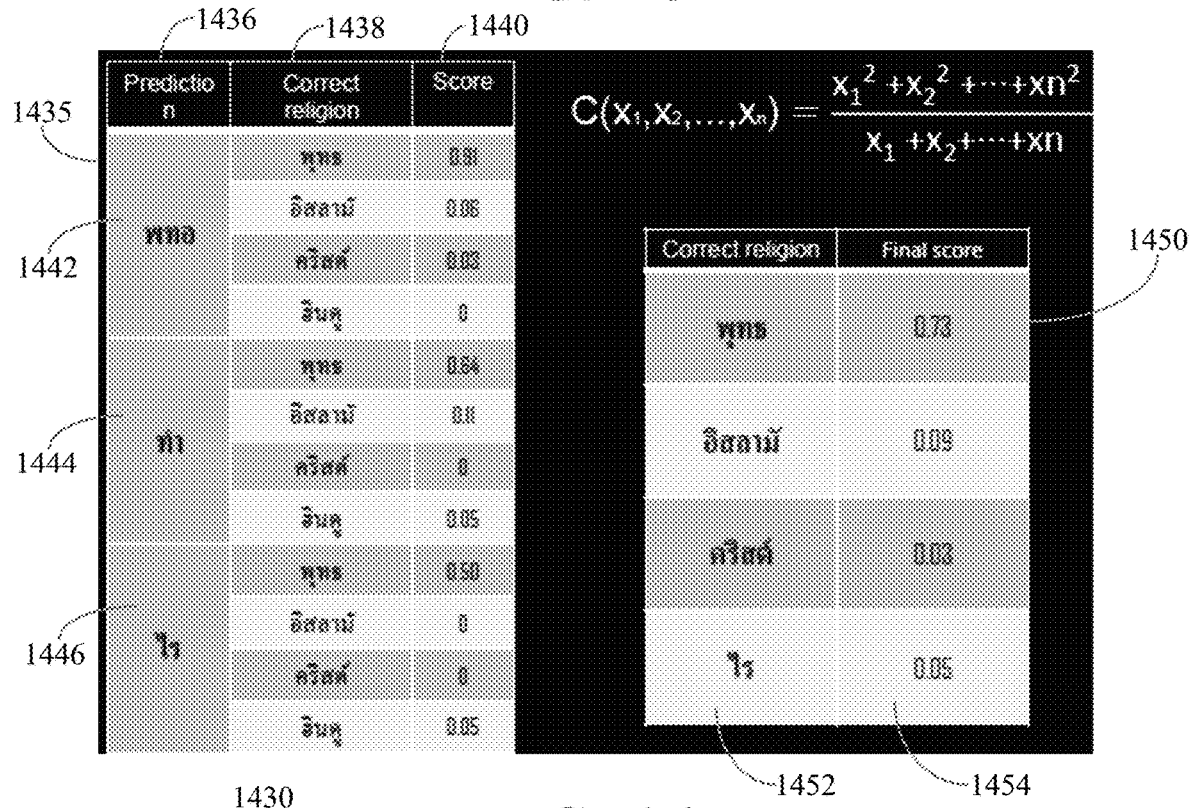
Figure 14C:
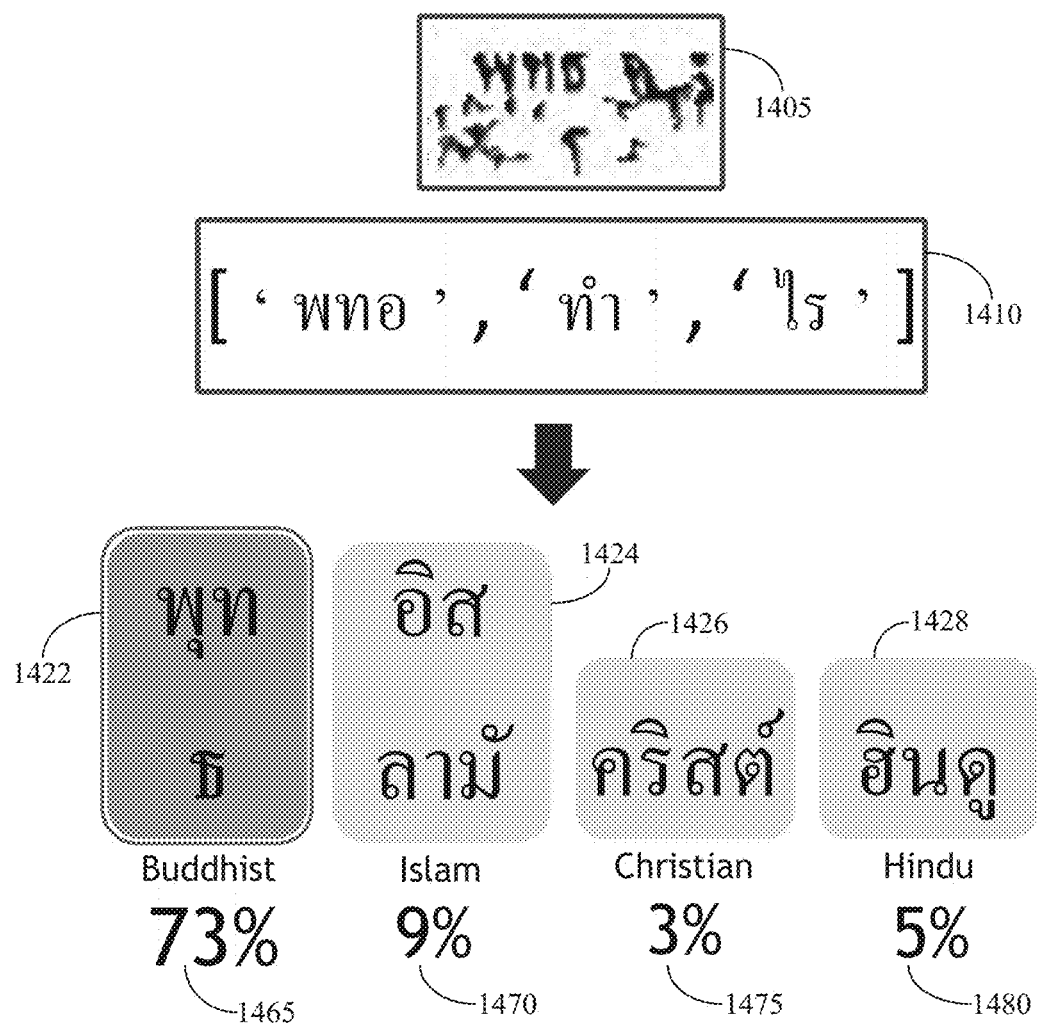

FIGS. 14A, 14B and 14C depict illustrations 1400, 1430, 1460 of categorization 482 by the categorization module 480 in accordance with the present embodiments. Referring to the illustration 1400, after Tesseract OCR 454 by the OCR module 450 and processing by the correction module 460, Thai input 1405 is input as corrected input 1410 to the categorization module 480 which categorizes 482 fields 484 such as the religion field with categorical values by calculating a similarity score between particular predefined category data and current data in the field. Note that in the corrected input field 1410, three data items have been identified. In order to determine the similarity score, each data item of the corrected input 1410 is compared to the possible religions 1420, which include Buddhism 1422, Islam 1424, Christian 1426 and Hindu.

The categorization 482 of the religion field input 1405 chooses a most probable value. In accordance with the present embodiments, three probability update steps are used to identify the most likely value to select as the final prediction. First, demographic data is used; next Tesseract's prediction length is used; and, finally, character-by-character similarity is used. Using these three probability update steps, a probability of likely religion category is calculated for each of the three predicted data items in the corrected input field 1410. An exemplary formula for calculating such similarity probabilities is equation (7) below:

$$C(x_1, x_2, \ldots, x_n) = \frac{x_1^2 + x_2^2 + \ldots + x_n^2}{x_1 + x_2 + \ldots x_n} \quad (7)$$

The illustration 1430 includes a table 1435 which shows a column 1436 of the predicted Thai character data items, a column 1438 of the Thai character correct religions, and a column 1440 of the calculated similarity probability score for each. For the first predicted Thai character data item 1442, the similarity probability score for Buddhism is 0.91, the similarity probability score for Islam is 0.06, the similarity probability score for Christianity is 0.03, and the similarity probability score for Hindu is 0. For the second predicted Thai character data item 1444, the similarity probability score for Buddhism is 0.64, the similarity probability score for Islam is 0.11, the similarity probability score for Christianity is 0, and the similarity probability score for Hindu is 0.05. And for the third predicted Thai character data item 1446, the similarity probability score for Buddhism is 0.50, the similarity probability score for Islam is 0, the similarity probability score for Christianity is 0, and the similarity probability score for Hindu is 0.5.

A second table 1450 includes a column 1452 of the Thai character correct religions and a column 1454 showing a final score for all Thai character data items 1442, 1444, 1446 calculated by averaging all of their non-zero scores. It can be seen that Buddhism has the highest Final Score of 73% similarity. The illustration 1460 is similar to the illustration 1400 (FIG. 14A) except the final scores 1465, 1470, 1475, 1480 have been added below the corresponding religions 1422, 1424, 1426, 1428.

Figure 15A:
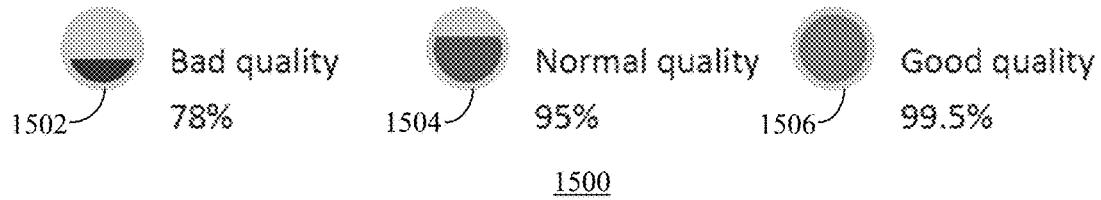

Referring to FIGS. 15A to 15G, illustrations 1500, 1510, 1520, 1530, 1550, 1570, 1590 depict graphical representations for accuracy measurements for the various modules 410, 420, 430, 440, 450, 460, 480 of the pipeline flow 420 in accordance with the present embodiments. Referring to FIG. 15A, accuracy of generation prediction and non-ID card detection by the generation prediction module 410 is shown in the graphical illustration 1500. The accuracy depends on the quality of the image, so performance of the generation prediction module 410 is measured for three different categories of images: bad quality of input images 1502, normal quality of input images 1504 and good quality of input images 1506, wherein quality of the input image means how well a rectangular image of the ID card is visible on the image. From the accuracy measurement of good quality input images 1506 it can be seen that accuracy of processing in accordance with the present embodiments is close to 100% when the quality of the input image is good. The accuracy of the generation prediction module 410, as seen from the accuracy measurement 1502, 1504, 1506, is biased for the scanned images where a rectangular outline of the input image is defined as a good image. When images are obtained not from scanning of ID cards but from pictures of ID cards such as pictures taken by a mobile phone, the generation prediction module 410 needs to be retrained as such pictures of ID cards do not have a rectangular outline but are instead pictured without boundaries.

Figure 15B:
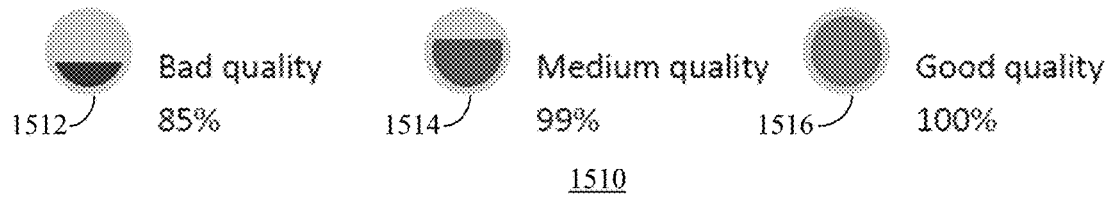

Referring to FIG. 15B, accuracy of ID card cropping by the ID card cropping module 420 is shown in the graphical illustration 1510. Similar to the generation prediction module 410, cropping and rotation by the ID cropping module 420 depends strongly on the quality of the images and, especially, on the level of noise in the background. For bad quality images, the accuracy 1512 of ID cropping using is about 85%, but when medium quality and good quality images are fed to the ID card cropping module 420, the accuracy 1514, 1516 is quite good. The accuracy measurements 1512, 1514 represent ID cropping using both the keypoint cropper 422 using KAZE and the morphological cropper 424 while the accuracy 1516 represents ID cropping using the lite version (i.e., only the morphological cropper 424). When using the lite operation of the ID cropper module 420, processing will be faster, but the accuracy will be decreased for medium quality and bad quality images.

Figure 15C:
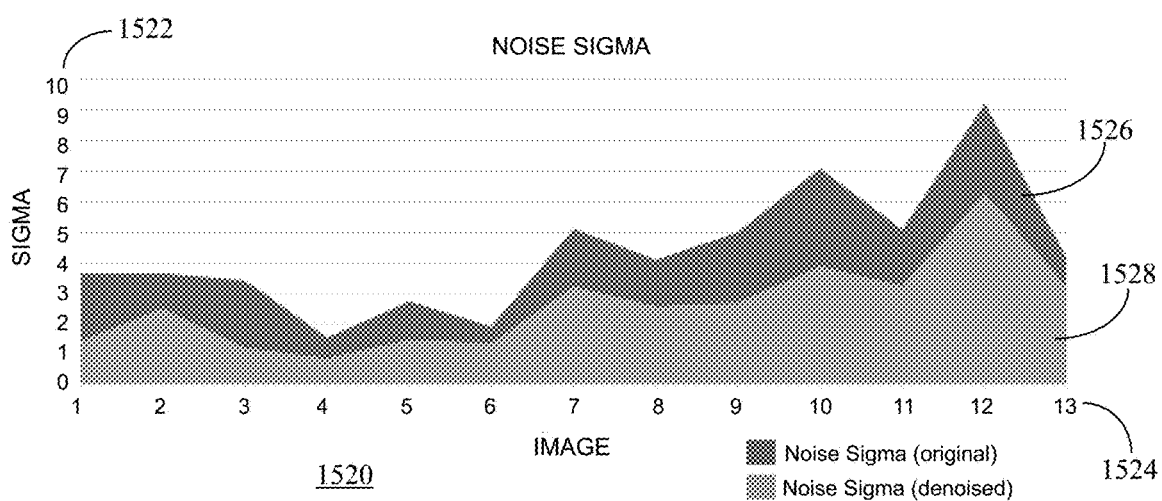

Referring to FIG. 15C, denoising of input images by the denoising module 440 is shown in the graph 1520. For image preprocessing, the image quality is important and the highest accuracy can be achieved when the images are clearly visible on a cleaned, denoised background. A level of noise in an image background can be measured by a "sigma" metric charted along the y-axis 1522. The smaller the sigma, the less measured noise in the background. Along the x-axis 1524, thirteen images are charted and the sigma values 1526 before denoising and the sigma values 1528 after denoising are depicted. From the graph 1520, it is clear that the denoising module 440 significantly reduces noise in the background of the image as seen from the sigma values 1526 before denoising as compared to the sigma values 1528 after denoising.

Figure 15D:
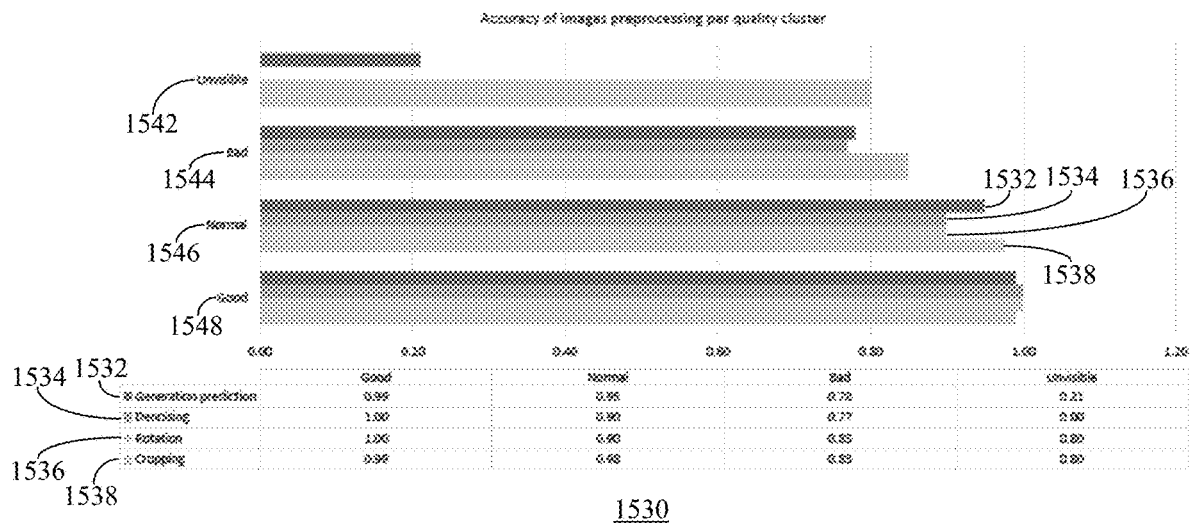

Referring to FIG. 15D, the bar graph 1530 depicts percentage accuracy of four preprocessing steps (i.e., generation prediction 1532, denoising 1534, ID rotation 1536 and ID cropping 1538) at four quality levels: unvisible 1542, bad quality 1544, medium quality 1546 and good quality 1548. From the bar graph 1530, it is apparent that good quality images 1548 are preprocessed to near perfect levels. Even with bad quality images 1544, preprocessing achieves 75% to 85% accuracy. And unvisible images 1542 can achieve 80% accuracy in ID rotation 1536 and ID cropping 1538.

Figure 15E:
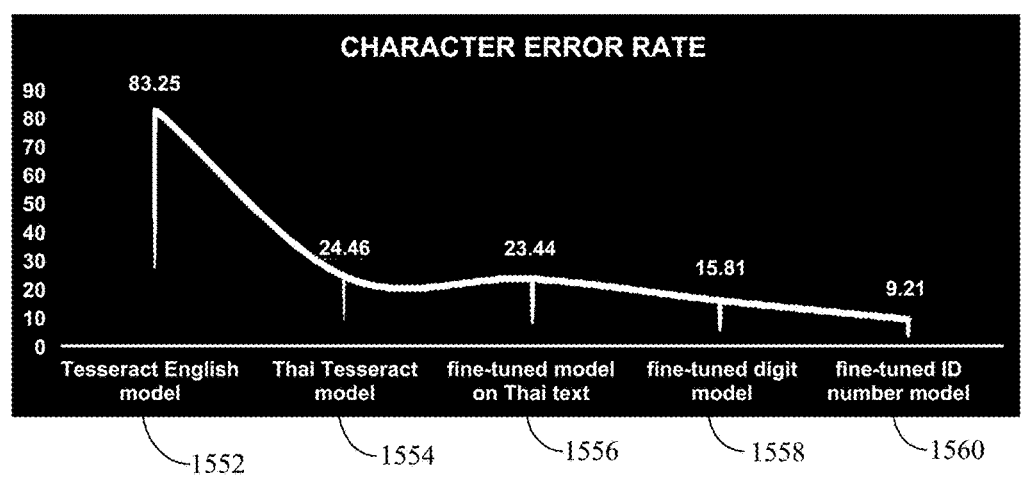

The graph 1550 of FIG. 15E depicts fine tuning of the Tesseract OCR 454 models as applied to the Thai character images. The simplest way for OCR was to use Tesseract OCR solution, which is trained on billions of images for each language separately. However, even with big training datasets, the quality was not high and was used as baseline for the next optimization steps. The first optimization steps were done with Tesseract model retraining with Thai or English images, which were labelled character based. When applying the retrained English model 1552, the character error rate was 83.25%. However, when applying the retrained Thai model 1554, the character error rate dropped to 24.46%. The models were fine-tuned for Thai text 1556 and for digits 1558. The fine-tuned model 1556 trained on Thai text had a character error rate of 23.44% while the fine-tuned model 1558 trained on digits had a character error rate of 15.81%. The digit-based model that gave the lowest character error rate is a fine-tuned digit-based model 1560 which had a character error rate for the ID number and date fields of 9.21%. Thus, it can be seen that fine-tuning of the Tesseract OCR models by real and synthetic images the error of character recognition significantly, especially for digit recognition in the ID number and date fields.

Figure 15F:
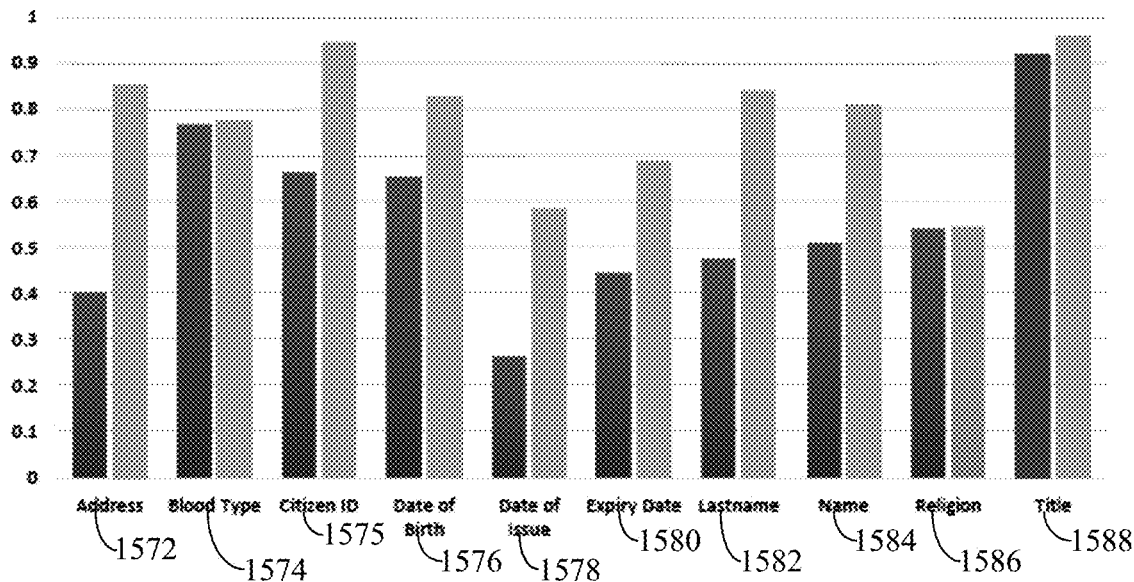

After Tesseract OCR prediction on different scaled images and by using different model modes, the next step was to apply correction by the correction module 460 (FIG. 4) and categorization by the categorization module 480. FIG. 15F depicts a bar graph 1570 depicting performance (as determined by similarity score) and accuracy of prediction of the pipeline 402 in accordance with the present embodiments. More particularly, the bar graph 1570 depicts the accuracy and similarity per field by taking the average value between English and Thai. For each field (i.e., address field 1572, blood type field 1574, citizen ID field 1575, date of birth field 1576, date of issue field 1578, expiry date field 1580, last name field 1582, name field 1584, religion field 1586, and title field 1588), the performance (i.e., the similarity score) is the left bar and the accuracy of prediction is the right bar. The final OCR accuracy and similarity is based on final output, which represents textual personal information. Focusing on the similarity score is recommended as it is calculated character by character and represents real error on character level. Accuracy, on the other hand, is calculated based on the exact match and could be set to zero if there is extra space in the review and one accent is missed in the word.

Figure 15G:
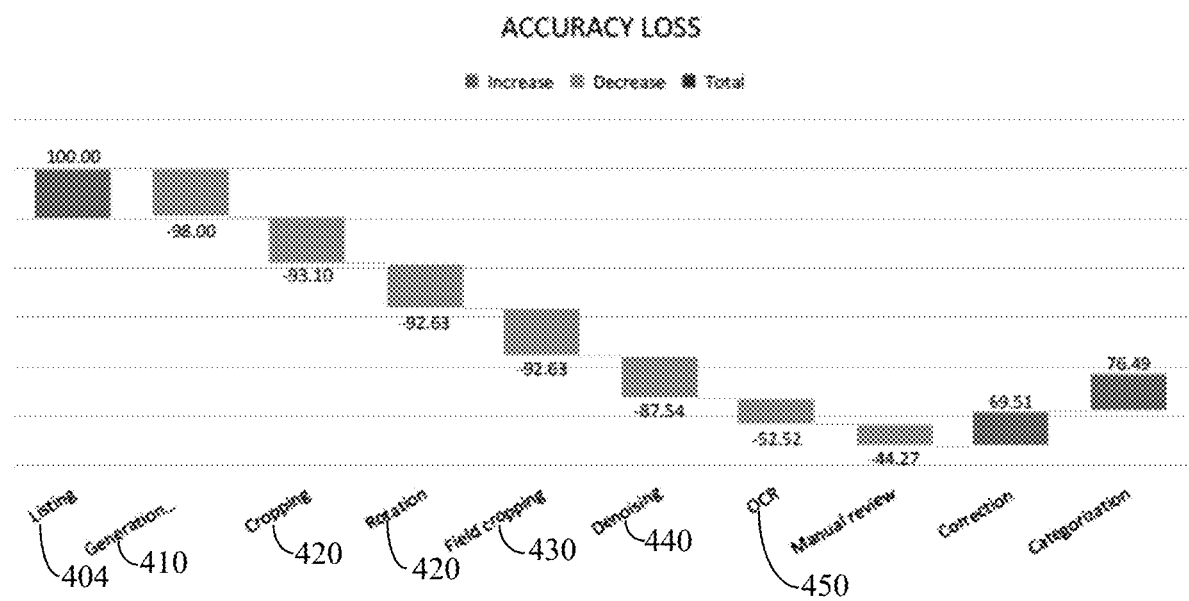

It is noted that some accuracy is lost on each of the main modules of the pipeline 402 (FIG. 4) like generation prediction 410, cropping and rotation 420 and OCR 450. The graphical illustration 1590 of FIG. 15G depicts accuracy decrease at each of module of the pipeline 402 from the listing module 404 to the OCR module 450. As OCR models are trained on manually reviewed documents, it is expected that manual review 1595 also created an impact on accuracy decrease. From the other hand, the accuracy of the prediction increases via the correction module 460 and the categorization module 480 by applying mistake correctors, text generators and similarity functions.

Figure 16A:
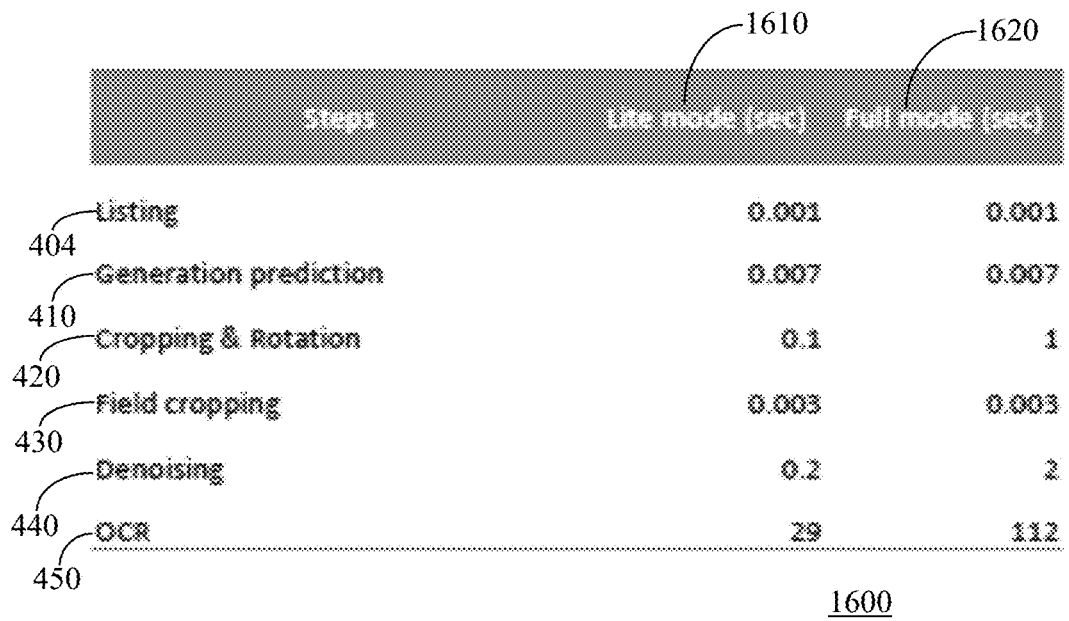
Figure 16B:
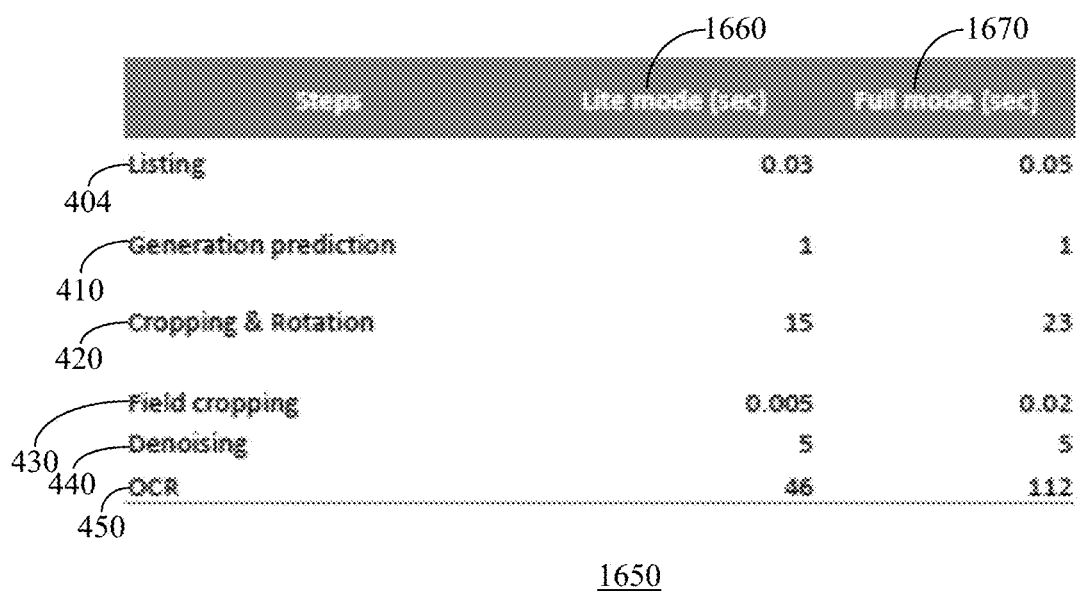

FIGS. 16A and 16B depict tables 1600, 1650 for lite version processing speed and full version processing speed of modules of the pipeline 402 in accordance with the present embodiments. The table 1600 depicts processing speeds for one image through the listing module 404, the generation prediction module 410, the cropping & rotation module 420, the field cropping module 430, the denoising module 440 and the OCR module 450 when implementing a lite (simplified) version of the pipeline 402 (speed at each module in the lite mode is indicated in column 1610) and when implementing a full (optimized) version of the pipeline 402 (speed at each module in the optimized full mode is indicated in column 1620).

Similarly, the table 1650 depicts processing speeds for a batch of twenty-five images through the listing module 404, the generation prediction module 410, the cropping & rotation module 420, the field cropping module 430, the denoising module 440 and the OCR module 450 when implementing a lite (simplified) version of the pipeline 402 (speed at each module in the lite mode is indicated in column 1660) and when implementing a full (optimized) version of the pipeline 402 (speed at each module in the optimized full mode is indicated in column 1670).

Figure 17A:
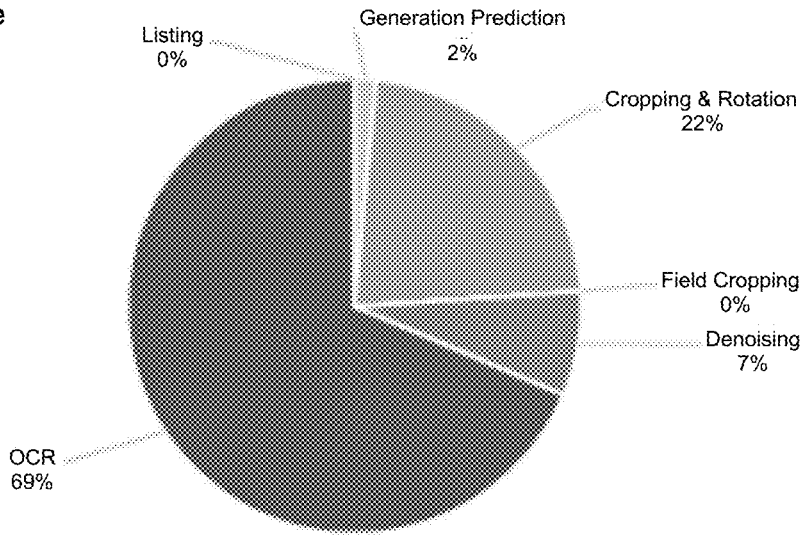
Figure 17B:
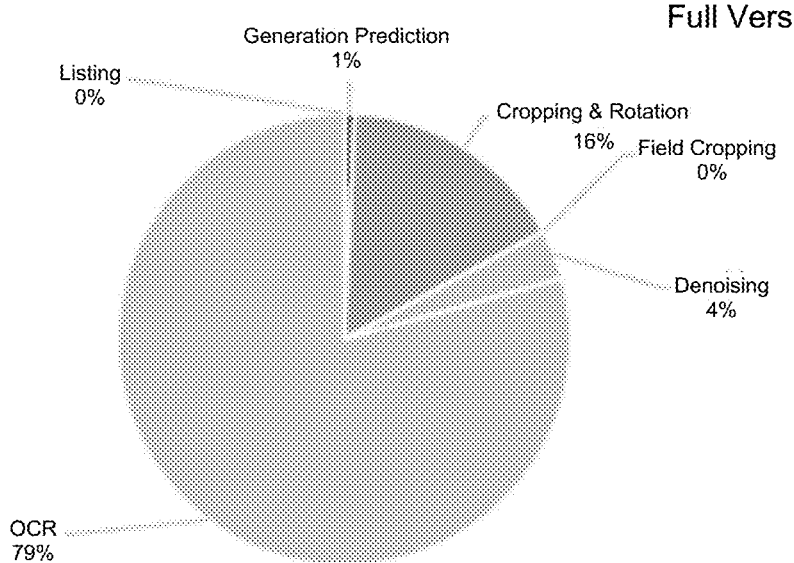

FIGS. 17A and 17B depict pie charts 1700, 1750 for lite version processing speed and full version processing speed of a batch of twenty-five images passing through the modules of the pipeline of FIG. 4 in accordance with the present embodiments. The pie chart 1700 depicts time distribution during lite mode processing and the pie chart 1750 depicts time distribution during full version processing. It can be seen that OCR takes the biggest part of the time for text extraction.

Figure 18A:
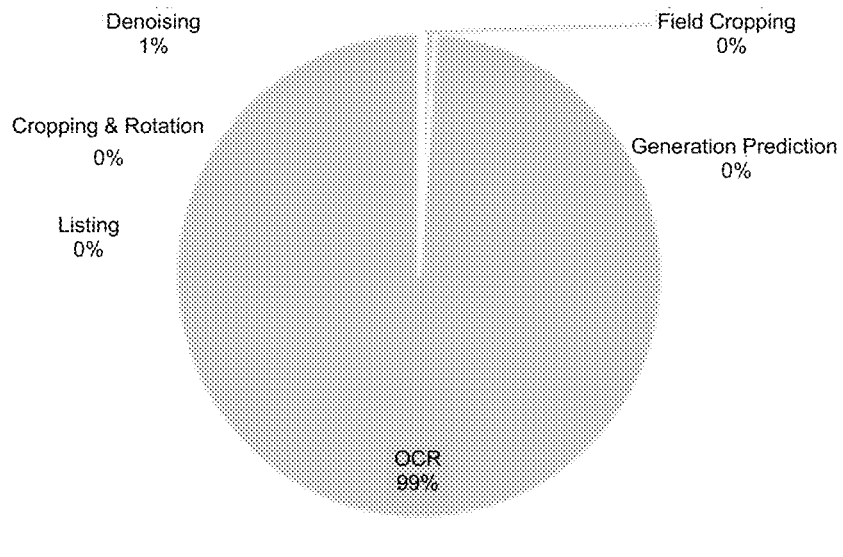
Figure 18B:
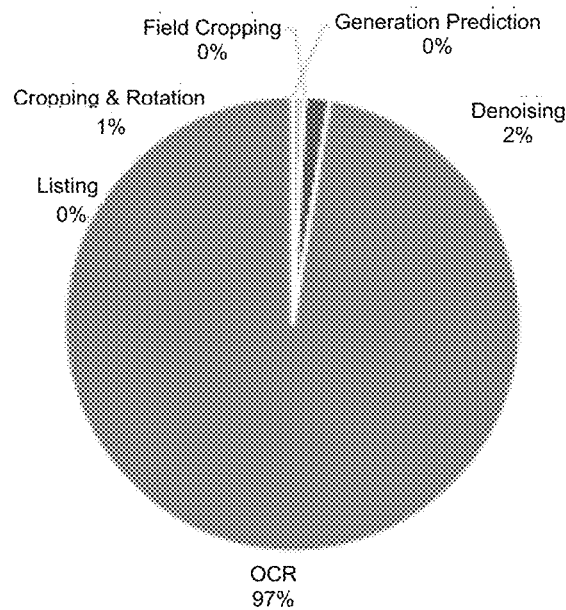

FIGS. 18A and 18B depict pie charts 1800, 1850 for lite version processing speed and full version processing speed of a single image passing through the modules of the pipeline of FIG. 4 in accordance with the present embodiments. The pie chart 1800 depicts time distribution during lite mode processing and the pie chart 1850 depicts time distribution during full version processing. OCR takes an even greater portion of the time distribution while all the other steps are fast for text extraction of a single image. Thus, reviewing the pie charts 1700, 1750, 1800, 1850, the OCR module 450 processes more efficiently for the batch of the images (i.e., as seen in the pie charts 1700, 1750) as is the images are multiprocessed between cores of the Tesseract OCR 454. Another way for optimization can be uploading and reading all the models at the beginning of the pipeline through an application programming interface (API) and keeping them alive. In this case, the OCR time could be significantly reduced, even for the one image (i.e., as seen in the pie charts 1800, 1850).

Thus, it can be seen that the present embodiments provide methods and systems for optical character recognition for extraction of personal information so that such personal information can be handled in accordance with data protection and privacy regulations that advantageously provide high accuracy, high speed and cost savings. The goal of OCR pipeline 402 is to extract all required text information from a scanned images which includes personal data. All available data is extracted according to an expected list of information to be extracted. The extracted data is stored in separate fields and, thus, the information which includes personal data is extracted and stored in a data storage system with a pre-defined structure. The pipeline advantageously embeds a logic to provide the scorings for the clarity of the information that can be extracted.

To address the challenge of scene text recognition or Optical Character Recognition (OCR), one of the most important and challenging tasks in image-based sequence recognition which has been a longstanding research topic in computer vision, the present embodiments advantageously provide a new data science technique, which combines feature extraction, sequence modelling and transcription into a unified framework. The unified framework in accordance with the present embodiments advantageously is end-to-end trainable; includes image pre-processing steps such as rescaling, rotation and denoising; calculates the level of confidence for each predicted output, which allows users to make real-time corrections; and generates an effective model which is more practical for real-world application scenarios.

While exemplary embodiments have been presented in the foregoing detailed description of the disclosure, it should be appreciated that a vast number of variations exist. It should further be appreciated that the exemplary embodiments are only examples, and are not intended to limit the scope, applicability, operation, or configuration of the disclosure in any way. Rather, the foregoing detailed description will provide those skilled in the art with a convenient road map for implementing an exemplary embodiment of the disclosure, it being understood that various changes may be made in the function and arrangement of steps and method of operation described in the exemplary embodiment without departing from the scope of the disclosure as set forth in the appended claims.

What is claimed is:

1. A method for extracting personal data from a sensitive document, the method comprising:
   predicting type of document by keypoint matching of the sensitive document;
   cropping the sensitive document in response to the type of document predicted to extract document shape and extract one or more fields, the one or more fields comprising text or pictures and the one or more fields comprising at least one categorical value field;
   denoising the one or more fields to prepare them for optical character recognition;
   performing optical character recognition on the denoised one or more fields to detect characters in the one or more fields; and
   categorizing the characters in the at least one categorical value field by calculating similarity scores between predefined category data corresponding to the at least one categorical value field and the detected characters in the at least one categorical value field.

2. The method in accordance with claim 1 wherein denoising the one or more images comprises utilizing a deterministic denoising approach combined with a Generative Adversarial Network (GAN) based noise modelling to denoise the one or more fields.

3. The method in accordance with claim 1, further comprising correcting character spelling mistakes and/or auto-generating missed or invisible characters using a trained Bidirectional Long Short-Term Memory (Bi-LSTM) language model.

4. The method in accordance with claim 1 wherein the method for extracting personal data from a sensitive document comprises a lite mode of operation which increases speed in favor of accuracy.

5. A method for extracting personal data from a sensitive document, the method comprising:
- predicting type of document by keypoint matching of the sensitive document;
- cropping the sensitive document in response to the type of document predicted to extract document shape and extract one or more fields, the one or more fields comprising text or pictures;
- denoising the one or more fields to prepare them for optical character recognition; and
- performing optical character recognition on the denoised one or more fields to detect characters in the one or more fields, wherein predicting the type of document by keypoint matching of the sensitive document comprises:
- extracting transformation invariant features corresponding to keypoints of the sensitive document;
- using a KAZE-based approach to associate each of the keypoints with a best-describing vector;
- building a Bag of Visual Word model having a plurality of clusters by clustering ones of the keypoints sharing same identified properties;
- counting the keypoints in each cluster to determine a number of clusters, the number of clusters corresponding to a size of a feature vector combining the vectors associated with the keypoints in the clusters; and
- predicting the type of document in response to the size of the feature vector.

6. The method in accordance with claim 5 wherein using a KAZE-based approach to associate each of the extracted features with a best-describing vector comprises fine-tuning the KAZE-based approach with hyperparameters to associate each of the extracted features with a best-describing vector.

7. The method in accordance with claim 5 wherein counting the keypoints in each cluster to determine a number of clusters comprises:
- using a pre-trained K-means model to determine a number of the keypoints in each cluster; and
- normalizing the numbers of the keypoints in the clusters to determine the number of clusters.

8. The method in accordance with claim 5 wherein predicting the type of document comprises using a pre-trained neural network to predict the type of document in response to the size of the feature vector.

9. A method for extracting personal data from a sensitive document, the method comprising:
- predicting type of document by keypoint matching of the sensitive document;
- cropping the sensitive document in response to the type of document predicted to extract document shape and extract one or more fields, the one or more fields comprising text or pictures;
- denoising the one or more fields to prepare them for optical character recognition; and
- performing optical character recognition on the denoised one or more fields to detect characters in the one or more fields, wherein performing optical character recognition (OCR) on the denoised one or more fields comprises utilizing a Tesseract OCR engine modified by providing a plurality of rescaled predicted field images to the Tesseract OCR engine to derive a most effective set of parameters for each of the one or more fields for control of the Tesseract OCR engine when detecting characters in the one or more fields.

10. A system for extracting personal data from a sensitive document, the system comprising:
- a document prediction module for type of document prediction of the sensitive document using a keypoint matching-based approach;
- a cropping module to extract document shape and extract one or more fields comprising text or pictures from the sensitive document, wherein the one or more fields comprise at least one categorical value field;
- a denoising module to prepare the one or more fields for optical character recognition (OCR);
- an OCR module for performing optical character recognition on the denoised one or more fields to detect characters in the one or more fields; and
- a categorization module for categorizing the characters in the at least one categorical value field by calculating similarity scores between predefined category data corresponding to the at least one categorical value field and the detected characters in the at least one categorical value field.

11. The system in accordance with claim 10 wherein the denoising module utilizes a deterministic denoising approach combined with a Generative Adversarial Network (GAN) based noise modelling to denoise the one or more fields.

12. The system in accordance with claim 10, further comprising a correction module for correcting character spelling mistakes and/or auto-generating missed or invisible characters using a trained Bidirectional Long Short-Term Memory (Bi-LSTM) language model.

13. The system in accordance with claim 10 wherein the system for extracting personal data from a sensitive document comprises a lite mode of operation which increases speed in favor of accuracy.

14. A system for extracting personal data from a sensitive document, the system comprising:
- a document prediction module for type of document prediction of the sensitive document using a keypoint matching-based approach;
- a cropping module to extract document shape and extract one or more fields comprising text or pictures from the sensitive document;
- a denoising module to prepare the one or more fields for optical character recognition (OCR); and
- an OCR module for performing optical character recognition on the denoised one or more fields to detect characters in the one or more fields,
- wherein the document prediction module comprises:
- a feature extraction device for extracting transformation invariant features corresponding to keypoints of the sensitive document;
- a keypoint-vector association device which uses a KAZE-based approach to associate each of the keypoints with a best-describing vector;
- a Bag of Words module for building a Bag of Visual Word model having a plurality of clusters by clustering ones of the keypoints sharing same identified properties;
- a keypoint in cluster counting module for counting the keypoints in each cluster to determine a number of clusters, the number of clusters corresponding to a size of a feature vector combining the vectors associated with the keypoints in the clusters; and
- a prediction module for predicting the type of document in response to the size of the feature vector.

15. The system in accordance with claim 14 wherein the keypoint-vector association device uses a fine-tuned KAZE-based approach with hyperparameters to associate each of the extracted features with a best-describing vector.

16. The system in accordance with claim 14 wherein the keypoint in cluster counting module comprises:
- a determiner using a pre-trained K-means model to determine a number of the keypoints in each cluster; and
- a normalizer to normalize the numbers of the keypoints in the clusters to determine the number of clusters.

17. The system in accordance with claim 14 wherein the document prediction module comprises a pre-trained neural network to predict the type of document in response to the size of the feature vector.

18. A system for extracting personal data from a sensitive document, the system comprising:
- a document prediction module for type of document prediction of the sensitive document using a keypoint matching-based approach;
- a cropping module to extract document shape and extract one or more fields comprising text or pictures from the sensitive document;
- a denoising module to prepare the one or more fields for optical character recognition (OCR); and
- an OCR module for performing optical character recognition on the denoised one or more fields to detect characters in the one or more fields, wherein the OCR module comprises a Tesseract OCR engine modified by providing a plurality of rescaled predicted field images to the Tesseract OCR engine to derive a most effective set of parameters for each of the one or more fields for control of the Tesseract OCR engine when detecting characters in the one or more fields.

* * * * *